(12) United States Patent
Marks

(10) Patent No.: US 9,647,965 B2
(45) Date of Patent: *May 9, 2017

(54) GROUP COMMUNICATIONS MULTIPLEXING SYSTEM

(71) Applicant: Daniel L. Marks, Urbana, IL (US)

(72) Inventor: Daniel L. Marks, Urbana, IL (US)

(73) Assignee: Windy City LLC, Chicago, IL (US)

( * ) Notice: Subject to any disclaimer, the term of this patent is extended or adjusted under 35 U.S.C. 154(b) by 73 days.

This patent is subject to a terminal disclaimer.

(21) Appl. No.: 14/246,965

(22) Filed: Apr. 7, 2014

(65) Prior Publication Data

US 2014/0222937 A1 Aug. 7, 2014

Related U.S. Application Data

(63) Continuation of application No. 09/399,578, filed on Sep. 20, 1999, now Pat. No. 8,694,657, which is a (Continued)

(51) Int. Cl.
*H04L 12/58* (2006.01)
*H04L 12/18* (2006.01)
(Continued)

(52) U.S. Cl.
CPC ............ *H04L 51/04* (2013.01); *G06Q 10/10* (2013.01); *G06Q 30/06* (2013.01); *H04L 12/1813* (2013.01); *H04L 12/1822* (2013.01)

(58) Field of Classification Search
None
See application file for complete search history.

(56) References Cited

U.S. PATENT DOCUMENTS 5,280,477 A 1/1994 Trapp
5,774,668 A 6/1998 Choquier et al.
(Continued)

FOREIGN PATENT DOCUMENTS

EP 0621532 A1 10/1994

OTHER PUBLICATIONS

Cockburn, A., & Greenberg, S. (Dec. 1993). Making contact: Getting the group communicating with groupware. In Proceedings of the conference on Organizational computing systems (pp. 31-41). ACM.*

(Continued)

*Primary Examiner* — Patrice Winder
(74) *Attorney, Agent, or Firm* — Peter K Trzyna

(57) ABSTRACT

A computerized human communication arbitrating and distributing system, including a controller digital computer and a plurality of participator digital computers, each of the participator computers including an input device for receiving human-input information from a human user and an output device for presenting information to the user. A connection, such as Internet, links the controller computer with each of the participator computers. Controller software runs on the controller computer to arbitrate in accordance with predefined rules, which ones of the participator computers can interact in one of a plurality of groups through the controller computer and to distribute real time data to the respective ones of the groups. Participator software runs on each of the participator computers to handle a user interface permitting one said user to send a multimedia information message to the controller computer, which arbitrates which of the participator computers receive the multimedia information message and conveys the multimedia information message to the selected participator computers to present the information to the respective user.

19 Claims, 22 Drawing Sheets

Related U.S. Application Data continuation of application No. 08/617,658, filed on Apr. 1, 1996, now Pat. No. 5,956,491.

(51) Int. Cl.
  *G06Q 10/10*  (2012.01)
  *G06Q 30/02*  (2012.01)
  *G06Q 30/06*  (2012.01)

(56) References Cited

U.S. PATENT DOCUMENTS

| | | | |
|---|---|---|---|
| 5,790,793 A | | 8/1998 | Higley |
| 5,793,365 A | * | 8/1998 | Tang ................... G06Q 10/10 715/758 |
| 5,838,906 A | | 11/1998 | Doyle et al. |
| 5,941,947 A | | 8/1999 | Brown |
| 6,608,636 B1 | | 8/2003 | Roseman |
| 8,407,356 B1 | * | 3/2013 | Marks ................... G06Q 10/10 709/204 |
| 8,458,245 B1 | | 6/2013 | Marks |
| 8,473,552 B1 | | 6/2013 | Marks |
| 8,694,657 B1 | | 4/2014 | Marks |

OTHER PUBLICATIONS

Greenberg, Saul, and Mark Roseman. "Registration for Real-Time Groupware." (1994) retrieved from Google Scholar.*
Garcia-Luna-Aceves, J. J., Craighill, E. J., & Lang, R. (Mar. 1988). An open-systems model for computer-supported collaboration. In Computer Workstations, 1988., Proceedings of the 2nd IEEE Conference on (pp. 40-51). IEEE.*
Pavel Curtis et al., The Jupiter Audio/Video Architecture: Secure Multimedia in Network Places, ACM Multimedia 95—Electronic Proceedings Nov. 5-9, 1995 San Francisco, California retrieved from ACM.com.*
USPTO, "Notice of Compliance with Notice of Filing Date Accorded to Petition" for U.S. Pat. No. 8,694,657. IPR2016-01155. *Microsoft Corporation v. Winday City Innvations LLC*. pp. 1-3.
USPTO, "Notice of Accepting Corrected Petition" for U.S. Pat. No. 8,694,657. IPR2016-01155. *Microsoft Corporation v. Windy City Innovations LLC*. pp. 1-2.
USPTO, "Windy City Innovations, LCL's Mandatory Notices Pursuant to 37 CFR Sect. 42.8(a)(2)" for U.S. Pat. No. 8,694,657. IPR2016-01155. *Microsoft Corporation v. Windy City Innovations LLC*. pp. 1-5.
USPTO, "Notice of Filing Date Accorded to Petition and Time for Filing Patent Owner Preliminary Response" for U.S. Pat. No. 8,694,657. IPR2016-01159. *Facebook, Inc. v. Windy City Innovations LLC*. pp. 1-5.
USPTO, "Windy City Innovations, LLC'S Mandatory Notices Pursuant to 37 CFR Sect. 42.8(a)(2)" for U.S. Pat. No. 8,694,657. IPR2016-01159.*Facebook, Inc. v. Windy City Innovations LLC*. Inter Partes Review No. IPR2016-01147, pp. 1-54.
USPTO, "Petition for Inter Partes Review of U.S. Pat. No. 8,473,552 Under 35 USC Sections 311-319 and 37 CFR Section 42.1-80 & 42.100-.123" *Microsoft Corporation v. Windy City Innovations LLC*. Inter Partes Review No. IPR2016-01147. pp. 1-54.
USPTO "Notice of Filing Date Accorded to Petition and Time for Filing Patent Owner Preliminary Response" U.S. Pat. No. 8,473,552. Case IPR2016-01137. *Microsoft Corporation v. Windy City Innovations LLC*. pp. 1-5.
USPTO, "Petition for Inter Partes Review of Claims 1-37 of U.S. Pat. No. 8,407,356" *Microsoft Corporation v. Windy City Innovations LLC*. pp. 1-78.
USPTO, "Petition for Inter Partes Review of U.S. Pat. No. 8,458,245 Under 35 USC Sections 311-319 and 37 CFR Section 42.1-80 & 42.100-.123" *Microsoft Corporation v. Windy City Innovations LLC*. Inter Partes Review No. IPR2016-01141. pp. 1-82.

USPTO, "Petition for Inter Partes Review of U.S. Pat. No. 8,694,657" *Microsoft Corporation v. Windy City innovations LLC*. Inter Fortes Review No. IPR2016-01155. pp. 1-82.
USPTO, "Petition for Inter Partes Review of U.S. Pat. No. 8,458,245" *FaceBook, Inc. v, Windy City innovations LLC*. pp. 1-71.
USPTO, "Petition for Inter Partes Review of U.S. Pat. No. 8,407,356" *FaceBook, Inc. v. Windy City innovations LLC*. pp. 1-72.
USPTO, "Petition for Inter Partes Review of U.S. Pat. No. 8,473,552" *FaceBook, Inc. v. Windy City Innovations LLC*. pp. 1-85.
USPTO, "Petition for Inter Partes Review of U.S. Pat. No. 8,694,657" *FaceBook, Inc. v. Windy City lnnovations LLC*. pp. 1-65.
USPTO, "Petition for Inter Fortes Review of U.S. Pat. No. 8,473,552 Under 35 USC Sections 311-319 arid 37 CFR Section 42.1-80 & 42.100-.123" *Microsoft Corporationv. Windy City Innovations LLC*. Inter Partes Review No. IPR2016-01137. pp. 1-77.
USPTO, "Petition for Inter Partes Review of U.S. Pat. No. 8,473,552 Under 35 USC Sections 311-319 and 37 CFR Section 42.1-80 & 42.100-,123" *Microsoft Corporation v. Windy City Innovations Llc*. Inter Partes Review No. IPR2016-01138, pp. 1-76.
USPTO, "Petition for Inter Partes Review of U.S. Pat. No. 8,473,552 Under 35 USC Sections 311-319 and 37 CFR Section 42.1-80 & 42.100-.123" *Microsoft Corporation v. Windy City Innovations LLC*. Inter Partes Review No. IPR2016-01146. pp. 1-81.
USPTO, "Petition for Inter Partes Review of U.S. Pat. No. 8,694,657" *Microsoft Corporation v. Windy City innovations LLC*. Inter Partes Review No. IPR2016-01155. pp. 1-82.
USPTO, "Petition for Inter Partes Review of U.S. Pat. No. 8,694,657" *FaceBook Inc. v. Windy City Innovations LLC*. pp. 1-65.
USPTO, "Declaration of Tai Lavian, Ph.D for U.S. Pat. No. 8,694,657" *Facebook Inc. v. Wndy City Innovations LLC*. pp. 1-96.
Vetter, Ronald, J. "Videoconferencing on the Internet" North Dakota State University. pp. 1-6. US.
Pike, Mary Ann "Using Mosiac" 1994. Que Corporation. pp. 1-152. US.
Lichty, Tom "The Official America Online for Maccintosh Membership Kit and Tour Guide" Second Edition, Ventana Press, 1994. pp. 1-121. US.
T. Berners, Lee, "Request for Comments: 1738" Xerox Corporation, University of Minnesota, Dec. 1994. pp. 1-25.
Coates, James, "The Internet Business Come Home;Aa Mailbox in Cyberspace Brings World to Your PC", Chicago Tribune Company, Mar. 26, 1995. pp. 1-7. US.
Pike, Mary Ann, Date Stamped Excerpts "Using Mosiac" 1994. Que Corporation. pp. 1-15. US.
Ichty, Tom, Date Stamped Excerpts "The Official America Online for Maccintosh Membership Kit and Tour Guide" Second Edition, Ventana Press, 1994. pp. 1-12. US.
USPTO, "Declaration of Christopher Schmandt Regarding U.S. Pat. No. 8,694,657" *Microsoft Corporation v. Windy City Innovations LLC*. Inter Partes Review No. IPR2016-01155. pp. 1-336.
Schmandt, Christopher. Cirriculum. pp. 1-7.
Branwyn, Gareth "Mosiac Quick Tour for Windows; Accessing and Navigating the Internet's Worl Wide Web" Ventana Press, 1994. pp. 1-221. US.
J. Oikarinen and a Reed, Request for Comments: 1459, May 1993, pp. 1-65. US.
King, Adrian "Inside Windows 95" Microsoft Press. 1994. pp. 1-521. US.
Custer, Helen and Cutler, David N. "Inside Windows NT" Microsoft Press. 1993. Pgs. 1-11.
Microsoft Press, Computer Dictionary, Second Edition; The Comprehensive Standard for Business, School, and Home. 1994. pp. 1-13.
Newton, Harry "Newton's Telecom Dictionary; The Official Dictionary of Computer Telephony, Telecommunications, Networking, Data Communications, Voice Processing and the Internet" Flatiron Publishing inc. 1994. pp. 1-10. US.
T. Berners-Lee et al. Request for Comments; 1738. Dec. 1994. pp. 1-23. US.
www Fall 94 Conference Trip Report. pp. 1-1. US.
www Fall 94 Computer Supported Cooperative Work. pp. 1-2.

(56) References Cited

OTHER PUBLICATIONS

Maggs, Bruce M. "Expert Report of Bruce M. Maggs" *Windy City Innovations* v. *AOL*. pp. 1-134.
Rickard, Jack "Mud Wrestling on the internet" Boardwatch Magazine. Sep. 1994. pp. 1-27. US.
Donath, Judith S. And Robertson, Neil "The Sociable Wed" pp. 1-5. US.
Donath, Judith S. And Robertson, Neil "The Sociable Web; Query Emails" pp. 1-22. US.
Goldstein, Ira et al. "The Second International WWW Conference 94 Mosiac and the Web; Advanced Proceedings vol. 1" pp. 1-22. US.
Microsoft Press "Win32 Programmer's Reference; vol. 2; System Services, Multimedia, Extensions, and Application Notes" 1993. pp. 1-7. US.
USPTO "Corrected Certificate of Service of Petiton in Pat. No. 8,473, 552" *Microsoft Corporation* v. *Windy City Innovations, LLC.* Inter Partes Review No. IPR2016-01138. pp. 1-3.
Weingarten, Jan and James, Phil "The Microsoft Network Tour Guide; Making the Most of the Windows 95 Online Service". Ventana. 1995. pp. 1-85. US.
"Computer Gaming World; The Premier Computer Game Magazine" May 1993. pp. 1-75. US.
Krol, Ed "Special Edition; The Whole Internet User's Guide" O'Reilly & Associates, Inc. 1994. pp. 1-39. US.
Bryant Allan D. "Growing and Maintaining a Successful BBS; a Sysop's Handbook" Addison Wesley Publishing. 1995. pp. 1-43. US.
Boardwatch Magazine, "The Top 100 BBSs in the US" Sep. 1994. pp. 1-7. US.
Donath, Judith S. And Robertson, Neil "The Sociable Web" pp. 1-3. US.
USPTO "Decaaton of Judith S. Donath U.S. Pat. No. 8,694,657"Inter Partes Revies No. IPR2016-01155. *Microsoft Corporation* v. *Windy City Innovations LLC*, pp. 1-5.
USPTO "Notice of Filing Date Accorded to Petition and Time for Filing Patent Owner Preliminary Response U.S. Pat. No. 8,473,552" Case IPR2016-01137. *Microsoft Corporation* v. *Windy City Innovations LLC.* pp. 1-5.
USPTO, "Declaration of Christopher Schmandt Regarding U.S. Pat. No. 8,473,552" *Microsoft Corporation* v. *Windy City Innovations LLC.* Inter Partes Review No. IPR2016-01137, pp. 1-203.
USPTO "Notice of Filing Date Accorded to Petition and Time for Filing Patent Owner Preliminary Response" U.S. Pat. No. 8,694,657, Case IPR2016-01155. *Microsoft Corporation* v. *Windy City Innovations LLC.* pp. 1-6.
USPTO "Notice of Filing Date Accorded to Petition and Time for Filing Patent Owner Preliminary Response" U.S. Pat. No. 8,473,552, Case IPR2016-01138. *Microsoft Corporation* v. *Windy City Innovations LLC.* pp. 1-5.
USPTO "WIndy City Innovations, LLC's Mandatory Notices Pursuant to 37 CFR Sect. 42.8(a)(2)" U.S. Pat. No. 8,473,552, Case IPR2016-01138. *Microsoft Corporation* v. *Windy City Innovations LLC.* pp. 1-5.
USPTO, "Windy City Innovations LLC's Preliminary Response to Petition for Inter Partes Review of U.S. Pat. No. 8,407,356" *Microsoft Corporation* v. *Windy City Innovations LLC.* Case No. IPR2016-01067. pp. 1-34.
Chandrajit Bajaj, Ph.D., "Declaration of Dr. Chandrajit Bajaj, Ph.D." *Microsoft Corporation* v. *Windy City innovations LLC.* U.S. Pat. No, 8,407,356. Case No. IPR2016-01067, pp. 1-15.
Merriam-Webster's Collegiate Dictionary. Tenth Edition. Merriam-Webster, Inc. Springfield, MA. USA. 1994. pp. 1-3.
Microsoft Press. Microsoft Press Computer Dictionary. Third Edition. Redmond, Washington, USA. 1997. Corporation. pp. 1-6.
Bitter, Gary G. "Macmillan Encyclopedia of Computers" vol. 1. Macmillan Publishing Company. 1992. pp. 1-6.

USPTO, "Windy City Innovations LLC's Preliminary Response to Petition for Inter Partes Review of U.S. Pat. No. 8,473,552" *Microsoft Corporation* v. *Windy City Innovations LLC.* Case No. IPR2016-01147, pp. 1-38.
Chandrajit Bajaj, Ph.D., "Declaration of Dr, Chandrajit Bajaj, Ph.D." *Microsoft Corporation* v. *Windy City Innovations LLC*, U.S. Pat. No. 8,473,552. Case No, IPR2016-01147. pp. 1-18.
USPTO, "Windy City Innovations LLC's Preliminary Response to Petition for Inter Partes Review of U.S. Pat. No. 8,473,552" *Microsoft Corporation* v. *Windy City Innovations LLC.* Case No. IPR2016-01137. pp. 1-37.
Chandrajit Bajaj, Ph.D "Declaration of Dr. Chandrajit Bajaj, Ph.D." *Microsoft Corporation* v. *Windy City innovations LLC.* U.S. Pat. No. 8.473,552. Case No. IPR2016-01137. pp. 1-17.
USPTO, "Windy City Innovations LLC's Preliminary Response to Petition for Inter Partes Review of U.S. Pat. No. 8,473,552" *Microsoft Corporation*v. *Windy City Innovations LLC.* Case No, IPR2016-01138. pp. 1-36.
Chandrajit Bajaj, Ph.D., "Declaration of Dr. Chandrajit Bajaj, Ph.D," *Microsoft Corporation* v. *Windy City Innovations LLC.* U.S. Pat. No. 8.473,552. Case No. IPR2016-01138, pp. 1-17.
USPTO, "Windy City Innovations LLC's Preliminary Response to Petition for Inter Partes Review of U.S. Pat. No. 8,458,245" *Microsoft Corporation* v. *Windy City Innovations LLC.* Case No. IPR2016-01141. Pgs. 1-38.
Chandrajit Bajaj, Ph.D., "Declaration of Dr. Chandrajit Bajaj, Ph.D." *Microsoft Corporation* v. *Windy City innovations LLC.* U.S. Pat. No. 8,458,245. Case No. IPR2016-01141. pp. 1-17.
USPTO, "Windy City Innovations LLC's Preliminary Response to Petition for Inter Partes Review of U.S. Pat. No. 8,473,552" *Microsoft Corporation* v. *Windy City Innovations LLC.* Case No, IPR2016-01146. pp. 1-40.
Chandrajit Bajaj, PH.D., "Declaration of Dr. Chandrajit Bajaj, PH.D," *Microsoft Corporation* v. *Windy City Innovations LLC.* U.S. Pat. No. 8.473,552. Case No. IPR2016-01146. pp. 1-18.
USPTO, "Windy City Innovations LLC's Preliminary Response to Petition for Inter Partes Review of U.S. Pat. No. 8,694,657" *Microsoft Corporation* v. *Windy City Innovations LLC.* Case No. IPR2016-01155. pp. 1-34.
Chandrajit Bajaj, Ph.D., "Declaration of Dr. Chandrajit Bajaj, Ph.D." *Microsoft Corporation* v. *Windy City Innovations LLC.* U.S. Pat. No. 8,694,657. Case No, IPR2016-01155. pp. 1-17.
USPTO, "Windy City Innovations LLC's Preliminary Response to Petition for Inter Partes Review of U.S. Pat. No. 8,694,657" *Facebook Inc.* v. *Windy City Innovations LLC.* Case No. IPR2016-01159. pp. 1-31.
Chandrajit Bajaj, Ph.D., "Declaration of Dr, Chandrajit Bajaj, PF1,D." *Facebook, Inc.* v. *Windy City Innovations LLC.* U.S. Pat. No. 8,694,657. Case No. IFR2016-01159. pp. 1-17.
USPTO, "Windy City Innovations LLC's Preliminary Response to Petition for Inter Partes Review of U.S. Pat. No. 8,473,552" *Facebook Inc.* v. *Windy City Innovations LLC.* Case No. IPR2016-01158. pp. 1-34.
Chandrajit Bajaj, Ph.D., "Declaration of Dr. Chandrejit Bajaj, Ph.D." *Facebook, Inc.* v. *Windy City innovations LLC.* U.S. Pat. No. 8,473,552. Case No. IPR2016-01158. pp. 1-17.
USPTO, "Windy City Innovations LLC's Preliminary Response to Petition for Inter Partes Review of U.S. Pat. No. 8,407,356" *Facebook Inc.* v. *Windy City Innovations LLC*, Case No. IPR2016-01157. pp. 1-34.
Chandrajit Bajaj, Ph.D., "Declaration of Dr. Chandrajit Bajaj, Ph.D." *Facebook, Inc.* v. *Windy City innovations LLC.* U.S. Pat. No. 8,407,356. Case No. IPR2016-01157. pp. 1-17.
USPTO, "Windy City Innovations LLC's Preliminary Response to Petition for Inter Partes Review of U.S. Pat. No. 8,458,245" *Facebook Inc.* v. *Windy City Innovations LLC.* Case No. IPR2016-01156. pp. 1-39.
Chandrajit Bajaj, Ph.D., "Declaration of Dr. Chandrajit Bajaj, Ph.D," *Facebook, Incv. Windy City Innovations LLC.* U.S. Pat. No. 8,458,245. Case No. IPR2016-01156. Pgs. 1-17.
Chandrajit Bajaj, Ph.D., "Resume and Biographical Sketch of Chandrajit L. Bajaj" Appendix A. pp. 1-3.

(56) References Cited

OTHER PUBLICATIONS

USPTO "Notice of Filing Date Accorded to Petition and Time for Filing Patent Owner Preliminary Response" U.S. Pat. No. 8,473,552. Case IPR2016-01138. *Microsoft Corporation v. Windy City Innovations LLC.* pp. 1-5.
USPTO "Corrected Certificate of Service Petition" U.S. Pat. No. 8,473,552. Case IPR2016-01138. *Microsoft Corporation v. Windy City Innovations LLC.* pp. 1-3.
USPTO "Notice of Accepting Corrected Petition" U.S. Pat. No. 8,473,552, Case IPR2016-01138. *Microsoft Corporation v. Windy City Innovations LLC*, pp. 1-2.
USPTO, "Petition for Inter Partes Review of U.S. Pat. No. 8,473,552 Under 35 USC Sections 311-319 and 37 CFR Section 42.1-80 & 42.100-.123" Case IPR2016-01146, *Microsoft Corporation v. Windy City Innovations LLC.* pp. 1-81.
USPTO "Notice of Filing Date Accorded to Petition and Time for Filing Patent Owner Preliminary Response" U.S. Pat. No. 8,473,552. Case IPR2016-01146. *Microsoft Corporation v. Windy City Innovations LLC.* pp. 1-5.
USPTO "Windy City Innovations, LLC's Mandatory Notices Pursuant to 37 CFR Sect. 42.8(a)(2)" U.S. Pat. No. 8,473,552. Case IPR2016-01146. *Microsoft Corporation v. Windy City Innovations LLC.* pp. 1-5.
USPTO, "Declaration of Christopher Schrnandt Regarding U.S. Pat. No. 8,473,552" *Microsoft Corporation v. Windy City Innovations LLC.* Inter Partes Review No. IPR2016-01146. pp. 1-192.
USPTO, "Declaration of Robert N. Stein for U.S. Pat. No. 8,473,552" *Microsoft Corporation v. Windy City Innovations LLC.* pp. 1-9.
"The Major BBS, Version 6.2, System Operations Manual" Galacticomm Inc., 1987-1994. pp. 1-450. US.
"Developer's Guide for the Major BBS, Version 6.2" Galacticomm Inc., 1989-1994. pp. 1-217. US.
Boardwatch Magazine. "Guide to Online Information Services and the Internet" Mar. 1995. pp. 1-10. US.
Gliedman, John. "A Truly Major BBS" Computer Shopper, Aug. 1994. pp. 1-3. US.
Mace, Scott, "Oracle Raises in Server Pricing Bathe " InfoWorld, Mar. 14, 1994. vol. 16, Issue 11. pp. 1-3. US.
"Galacticomrn Calendar" Galaticomm Inc. Jul. 1995 through Jun. 1996, pp. 1-13. US.
Carton, Sean. "Internet Virtual Worlds Quick Tour, Muds, Moos, & Mushes, Interactive Games, Conferences and Forums" Ventana Publishing. 1994. pp. 1-220. US.
Newberg, Lee A. et. al. "Integraing the World Wde Web and Mutiuser Domains to Support Advanced Nework-Based Learning Environments" the University of Chicago. Oct. 21, 1994. pp. 1-6. US.
Curtis, Pavel et. al. "The Jupiter Audio/Video Architecture; Secure Multimedia in Network Places" Xerox Palo Alto Research Center. 1995. pp. 1-12. US.
USPTO, "Petition for Inter partes Review of U.S. Pat. No. 8,473,552 Under 35 USC Sections 311-319 and 37 CFR Section 42.1-80 & 42.100-,123" Case IPR2016-01147. *Microsoft Corporation v. Windy City Innovations LLC.* pp. 1-54.
USPTO "Notice of Filing Date Accorded to Petition and Time for Filing Patent Owner Preliminary Response" U.S. Pat. No. 8,473,552. Case IPR2016-01147. *Microsoft Corporation v. Windy City Innovations LLC.* pp. 1-5.
USPTO "Windy City Innovations, LLC's Mandatory Notices Pursuant to 37 CFR Sect. 42.8(a)(2)" U.S. Pat. No. 8,473,552. Case IPR2016-01147, *Microsoft Corporation v. Windy City Innovations LLC.* pp. 1-5.
USPTO, "Declaration of Christopher Schmandt Regarding U.S. Pat. No. 8,473,552" *Microsoft Corporation v. Windy City Innovations LLC.* Inter partes Review No. IPR2016-01147, pp. 1-192.
Donath, Judith "Declaration of Judith S. Donath Regarding the Publication of The Sociable Web" Jun. 2, 2016. pp. 1-4.
Donath, Judith S. & Robertson, Neil "The Sociable Web" MIT Media Lab. pp. 1-3. US.

USPTO "Notice of Filing Date Accorded to Petition and Time for Filing Patent Owner Preliminary Response" U.S. Pat. No. 8,473,552. Case IPR2016-01158. *Facebook Inc. v. Windy City Innovations LLC.* pp. 1-5.
USPTO "Windy City Innovations, LLC's Mandatory Notices Pursuant to 37 CFR Sect. 42,8(a)(2)" U.S. Pat. No. Case IPR2016-01158. *Facebook Inc. v. Windy City Innovations LLC.* pp. 1-5.
USPTO "Declaration of Tal Lavian, Ph.D." U.S. Pat. No. 8,473,552. Case IPR2016-01158. *Facebook Inc. v. Windy City Innovations LLC.* pp. 1-120.
USPTO "Notice of Filing Date Accorded to Petition and Time for Filing Patent Owner Preliminary Response" U.S. Pat. No. 8,458,245. Case IPR2016-01141. *Microsoft Corporation v. Windy City Innovations LLC.* pp. 1-5.
USPTO "Windy City Innovations, LLC's Mandatory Notices Pursuant to 37 CFR Sect. 42.8(a)(2)" U.S. Pat. No. 8,458,245. Case IFR2016-01141. *Microsoft Corporation v. Windy City Innovations LLC.* pp. 1-5.
USPTO, "Declaration of Christopher Schmandt Regarding U.S. Pat. No. 8,458,245" *Microsoft Corporation v. Windy City Innovations LLC.* Inter Partes Review No. IPR2016-01141. pp. 1-158.
USPTO, "Declaration of Robert N. Stein for U.S. Pat. No. 8,458,245" *Microsoft Corporation v. Windy City Innovations LLC.* Inter Partes Review No. IPR2016-01141. pp. 1-9.
"Netscape Smartmarks and Netscape Chat Offer New Navigation" Information Today, Oct. 12 1995; 9. pp. 1-1. US.
USPTO, "Notice of Filing Date Accorded to Petition and Time for Filing Patent Owner Preliminary Response" for U.S. Pat. No. 8,458,245. IPR2016-00156. *FaceBook, Inc. v. Windy City Innovations LLC.* pp. 1-5.
USPTO "Windy City Innovations, LLC's Mandatory Notices Pursuant to 37 CFR Sect. 42.8(a)(2)" for U.S. Pat. No. 8,407,356. IPR2016-01067. *Microsoft Corporation v. Windy City Innovations LLC.* pp. 1-5.
USPTO "Declaration of Tai Lavian, Ph.D" U.S. Pat. No. 8,458,245. Case IPR2016-01156. *Facebook Inc. v. Windy City Innovations LLC.* pp. 1-98.
USPTO, "Notice of Filing Date Accorded to Petition and Time for Filing Patent Owner Preliminary Response" for U.S. Pat. No. 8,407,356. IPR2016-01067. *Microsoft Corporation v. Windy City Innovations LLC.* pp. 1-4.
USPTO "Office Action-Final Rejection" for U.S. Appl. No. 11/836,633, mailed Feb. 3, 2012. pp. 1-13.
Trzyna, Peter K. "Request for Reconsideration" for U.S. Appl. No. 11/836,633, dated Mar. 29, 2012. pp. 1-8.
Hollaar, Lee A. "Declaration of Professor Lee a. Hollaar" for U.S. Appl. No. 11/836,633, dated Mar. 26, 2012. pp. 1-4.
USPTO "Office Action-Final Rejection" for U.S. Appl. No. 11/836,633, mailed Oct. 16, 2012. pp. 1-17.
Trzyna, Peter K. "Amendment After Final and Request for Reconsideration" for U.S. Appl. No. 11/836,633, dated Jan. 16, 2013. pp. 1-14.
USPTO "Response to Affidavit Filed Under 1.132" for U.S. Appl. No. 11/836,633, mailed May 2, 2012. pp. 1-5.
USPTO "Notice of Allowance" for U.S. Appl. No. 11/836,633, mailed Feb. 14, 2013. pp. 1-8.
USPTO, "Declaration of Christopher Schmandt Regarding U.S. Pat. No. 8,407,356" *Microsoft Corporation v. Windy City Innovations LLC.* Inter Partes Review No. IPR2016-01067. pp. 1-130.
U.S. Appl. No. 08/472,807. US Dept. Of Commerce. Patent and Trademark Office. pp. 1-78.
USPTO, "Declaration of Marla Beier for U.S. Pat. No. 8,407,356" *Microsoft Corporation v. Windy City Innovations LLC.* Inter Partes Review No. IPR2016-01067. pp. 1-25.
Trzyna, Peter L. "Transmittal Letter and Filing of Information Disclosure Statement and PTO Form 1449" for U.S. Appl. No. 11/826,633, files Jan. 18, 2008. pp. 1-138.
USPTO, "Notice of Filing Date Accorded to Petition and Time for Filing Patent Owner Preliminary Response" for U.S. Pat. No. 8,694,657. IPR2016-01155. *Microsoft Corporation v. Windy City Innovations LLC.* pp. 1-6.

* cited by examiner

CENTRAL CONTROLLER LOOP COMMUNICATIONS

CLIENT CHANNEL DATA STRUCTURE AND INFORMATION FLOW DIAGRAM

PARTICIPATION SOFTWARE OUT-OF-BAND MULTIMEDIA
OUT-OF-BAND MULTIMEDIA INFORMATION FLOW DIAGRAM

FIG. 34

```
Telnet - eagle.ais.net                                    _ □ X
Connect  Edit  Terminal  Help
                                          | *DMARKS "Daniel Marks
                                          | ME "Me." ■
                                          |
                                          |
                                          |
                                          |
                                          |
                                          |
                                          +_ _ _ _ _ _ _ _ _ _ .
                                          | Type what you wish
                                          | to say on the
                                          | channel and press
                                          | ENTER. Press CTL-L
DMARKS: hello thereDMARKS: hello there    | to change channels.
ME: hi there                              | Type TAB, and press
Private message from DMARKS (press CTRL-P | the arow keys to
 to see it)                               | see who is on the
---Channel: TESTCHANNEL-------------------| channel. Press
                                          | CTL-P for private
                                          | messages.
```

GROUP COMMUNICATIONS MULTIPLEXING SYSTEM

I. PRIORITY DATA

The present patent application is a continuation of U.S. Ser. No. 09/399,578, filed on Sep. 20, 1999, issuing as U.S. Pat. No. 8,694,657 on Apr. 8, 2014. U.S. Ser. No. 09/399,578 is a continuation of U.S. Ser. No. 08/617,658, filed on Apr. 1, 1996, issuing as U.S. Pat. No. 5,956,491 on Sep. 21, 1999. The present patent application incorporates by reference from both for all purposes as if fully set forth herein therefrom.

II. FIELD OF INVENTION

This invention is directed to an apparatus, a manufacture, and methods for making and using the same, in a field of digital electrical computer systems. More particularly, the present invention is directed to a digital electrical computer system involving a plurality of participator computers linked by a network to at least one of a plurality of participator computers, the participator computers operating in conjunction with the controller computer to handle multiplexing operations for communications involving groups of some of the participator computers.

III. BACKGROUND OF THE INVENTION

Multiplexing group communications among computers ranges from very simple to very complex communications systems. At a simple level, group communications among computers involves electronic mail sent in a one way transmission to all those in a group or subgroup using, say, a local area network. Arbitrating which computers receive electronic mail is a rather well understood undertaking.

On a more complex level, corporations may link remote offices to have a conference by computer. A central computer can control the multiplexing of what appears as an electronic equivalent to a discussion involving many individuals.

Even more complex is linking of computers to communicate in what has become known as a "chat room." Chat room communications can be mere text, such as that offered locally on a file server, or can involve graphics and certain multimedia capability, as exemplified by such Internet service providers as America On Line. Multiplexing in multimedia is more complex for this electronic environment.

On the Internet, "chat room" communications analogous to America On Line have not been developed, at least in part because Internet was structured for one-way communications analogous to electronic mail, rather than for real time group chat room communications. Further, unlike the an Internet service provider, which has control over both the hardware platform and the computer program running on the platform to create the "chat room", there is no particular control over the platform that would be encountered on the Internet. Therefore, development of multiplexing technology for such an environment has been minimal.

Even with an emergence of the World Wide Web, which does have certain graphical multimedia capability, sophisticated chat room communication multiplexing has been the domain of the Internet service providers. Users therefore have a choice between the limited audience of a particular Internet Service provider or the limited chat capability of the Internet.

IV. SUMMARY OF THE INVENTION

It is an object of the present invention to overcome such limitations of the prior art and to advance and improve the technology of group computer multiplexing to enable better computerized group communications.

It is another object of the present invention to provide a computerized human communication arbitrating and distributing system.

It is yet another object of the present invention to provide a group communication multiplexing system involving a controller digital computer linked to a plurality of participator computers to organize communications by groups of the participator computers.

It is still another object of the present invention to link the controller computer and the plurality of computers with respective software coordinated to arbitrate multiplexing activities.

It is still a further object of the present invention to provide a chat capability suitable for handling graphical, textual, and multimedia information in a platform independent manner.

These and other objects and utilities of the invention, which apparent from the discussion herein, are addressed by a computerized human communication arbitrating and distributing system. The system includes a controller digital electrical computer and a plurality of participator digital computers, each of the participator computers including an input device for receiving human-input information and an output device for presenting information to a user having a user identity. A connection such as the Internet links the controller computer with each of the participator computers.

Controller software runs on the controller computer, programming the controller computer to arbitrate in accordance with predefined rules including said user identity, which ones of the participator computers can interact in one of a plurality of groups communicating through the controller computer and to distribute real time data to the respective ones of the groups.

Participator software runs on each of the participator computers to program each of the participator computers to operate a user interface. The user interface permits one of the users to send and/or receive a multimedia information message to the controller computer, which arbitrates which of the participator computers receives the multimedia information message. The controller computer also conveys the multimedia information message to the selected participator computers to present the multimedia information to the respective user.

Therefore, for a computer system involving a plurality of programmed participator computers running the participator computer program can interact through a programmed controller computer with the controller computer multiplexing the communications for groups formed from the plurality, as well as arbitrating communications behavior.

V. BRIEF DESCRIPTION OF THE DRAWINGS

FIG. 34 is another illustration of a text-based interface group with moderator screen of the present invention.

VI. DETAILED DESCRIPTION OF THE DRAWINGS

In providing a detailed description of a preferred embodiment of the present invention, reference is made to an appendix hereto, including the following items.

Appendix Contents
ALLUSER C
ALLUSER H
CHANNEL C
CHANNEL H
CHANNEL HLP
CLIST C
CLIST H
CLIST HLP
EDITUSER C
EDITUSER H
ENTRYFRM C
ENTRYFRM H
ENTRYFRM HLP
HELP C
HELP H
HELPSCR C
HELPSCR H
LINEEDIT C
LINEEDIT H
LIST C
LIST H
LOGIN HLP
MAIN C
MAKEFILE
MESSAGE C
MESSAGE H
MODERAT HLP
PRIVATE C
PRIVATE H
PRIVATE HLP
SOCKIO C
SOCKIO H
STR C
STR H
UCCLIENT
USER C
USER H
WINDOW C
WINDOW H Note that the appendix includes code for two different embodiments: a Tellnet embodiment and a JAVA embodiment. Documentation and error messages, help files, log files, are also included in the appendix. While platform controlled embodiments are within the scope of the invention, it is particularly advantageous to have a platform independent embodiment, i.e., an embodiment that is byte code compiled.

Figure 1:
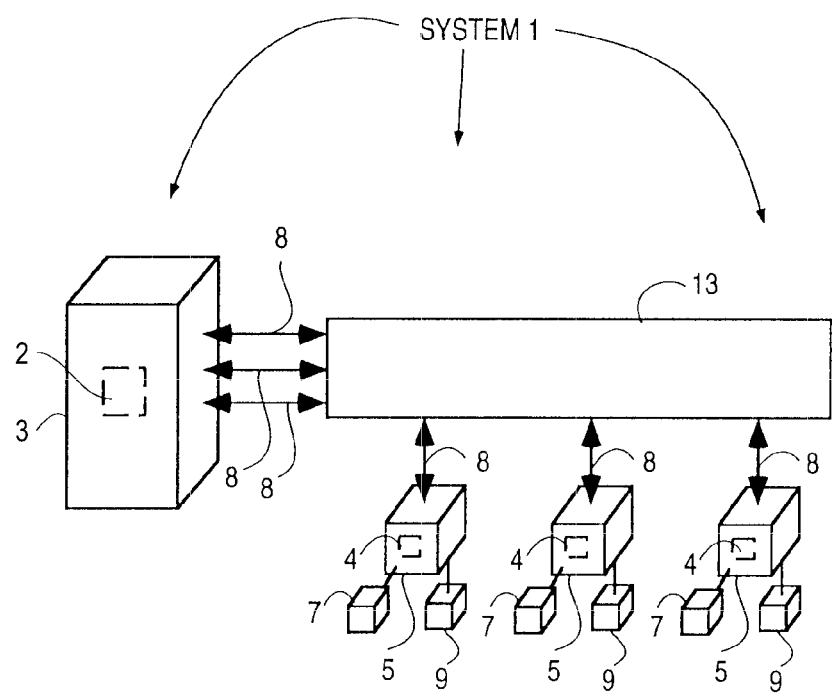
FIG. 1 is a depiction of hardware suitable for performing the present invention.

Referring now to FIG. 1, the overall functioning of a computerized human communication arbitrating and distributing System 1 of the present invention is shown with odd numbers designating hardware or programmed hardware, and even numbers designating computer program logic and data flow. The System 1 includes a digital Controller Computer 3, such as an Internet service provider-type computer. The Controller Computer 3 is operating with an operating system.

System 1 also includes a plurality of digital Participator Computers 5, each of which may be an IBM-compatible personal computer with a processor and a DOS operating system. Each of the Participator Computers 5 includes an Input Device 7 for receiving human-input information from a respective human user. The Input Device 7 can be, for example, a keyboard, mouse or the like. Each of the Participator Computers 5 also includes an Output Device 9 for presenting information to the respective user. The Output Device 9 can be a monitor, printer (such as a dot-matrix or laser printer), or preferably both are used. Each of the Participator Computers 5 also includes a Memory 11, such as a disk storage means.

The System 1 includes a Connection 13 located between, so as to link, the Controller Computer 3 with each of the Participator Computers 5. The Connection 13 can be an Internet or more particularly, a World Wide Web connection.

The Controller Computer 3 is running and under the control of Controller Software 2, which directs the Controller Computer 3 to arbitrate in accordance with predefined rules including a user identity, which ones of the Participator Computers 5 can interact in one of a plurality of groups through the Controller Computer 3 and to distribute real time data to the respective ones of the groups.

The Participator Computers 5 are each running and under the control of Participator Software 4, which directs each of the Participator Computers 5 to handle a user Interface 6 permitting one said user to send a multimedia information Message 8 to the Controller Computer 3, which arbitrates which of the Participator Computers 5 receives the multimedia information Message 8 and which conveys the multimedia information Message 8 to the selected participator computers 5 to present the multimedia information Message 8 to the respective user.

The present invention comprehends communicating all electrically communicable multimedia information as Message 8, by such means as pointers, for example, URLs. URLs can point to pre-stored audio and video communications, which the Controller Computer 3 can fetch and communicate to the Participator Computers 5.

Figure 2:
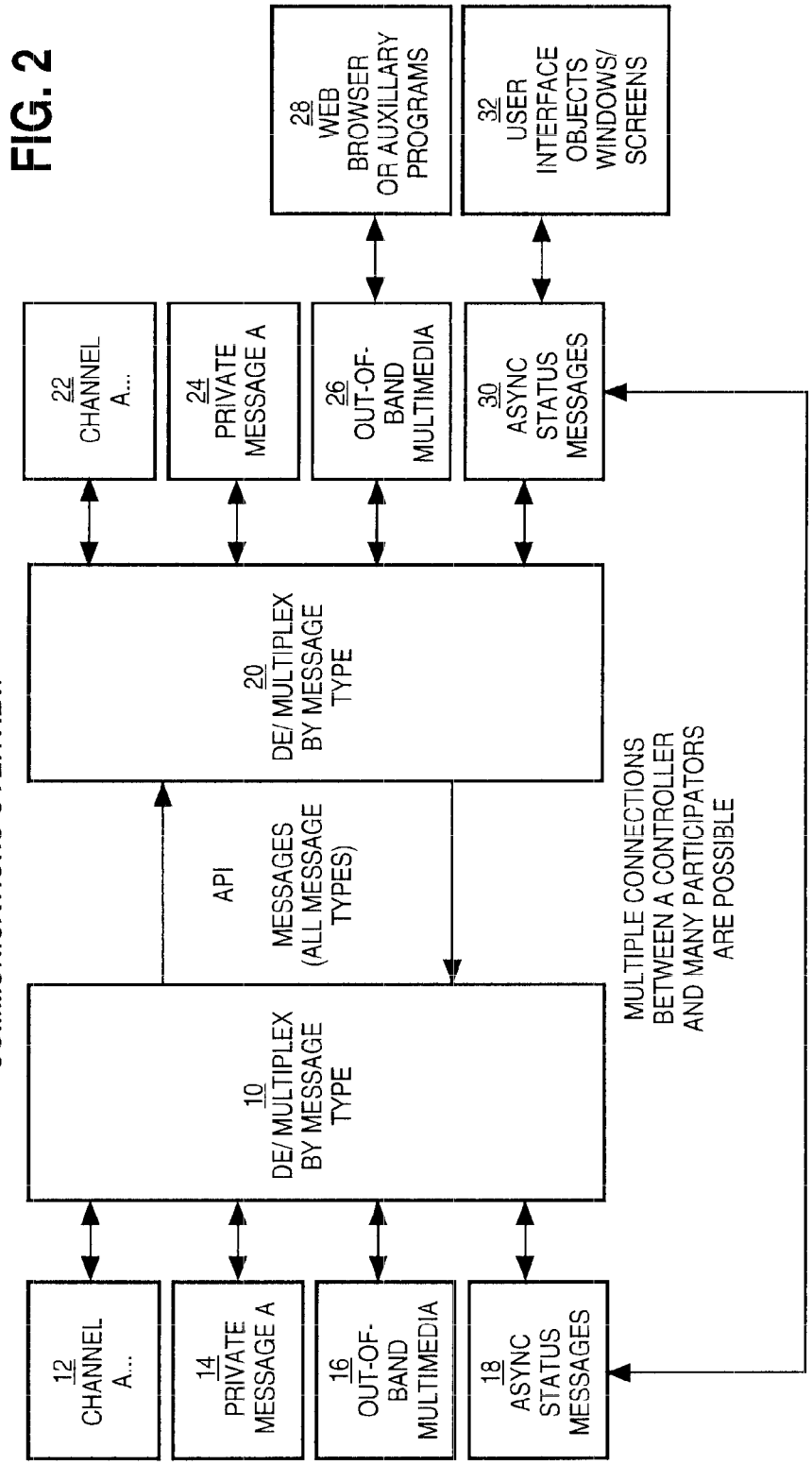
FIG. 2 is a communications overview of the present invention.

Turning now to FIG. 2, there is shown a communications overview of the present invention. Beginning with the Controller Computer Software 2, reference is made to Block 10, which illustrates demultiplexing and multiplexing operations carried out by message type on API messages of all types. Block 10 links to Block 12, which is illustrative of channel A . . . Block 10 also links to Block 14, which illustrates handling private message A. Block 10 also links to Block 16, illustrative of handling out-of-band media. Block 10 additionally links to Block 18, which illustrates asynchronous status messages.

Multiple connections between the controller computer 3 and a plurality of participator computers 5 permit communication implemented via the interplay of controller software 2 and participator software 4. With particular regard to the participator software 4 illustrated in FIG. 2, Block 20 is illustrative of demultiplexing and multiplexing operations carried out by message type on API messages of all types. Block 20 links to Block 22, which is illustrative of channel A . . . Block 20 also links to Block 24, which illustrates handling private message A. Block 20 also links to Block 26, illustrative of handling out-of-band media via Block 28, which is illustrative of a Web browser or auxiliary computer program. Block 20 also links to Block 30, which illustrates asynchronous status message handling via Block 32, illustrative of user interface objects windows and screens.

De/multiplexing via API provides a "virtual connection" between Channel, Private Message, and Multimedia objects in the controller computer 3 and each participator computer 5. An alternate architecture is to allow for a separate connection between each object so that multiplexing/demultiplexing is not necessary and each object handles its own connection. This would influence system performance, however.

Figure 3:
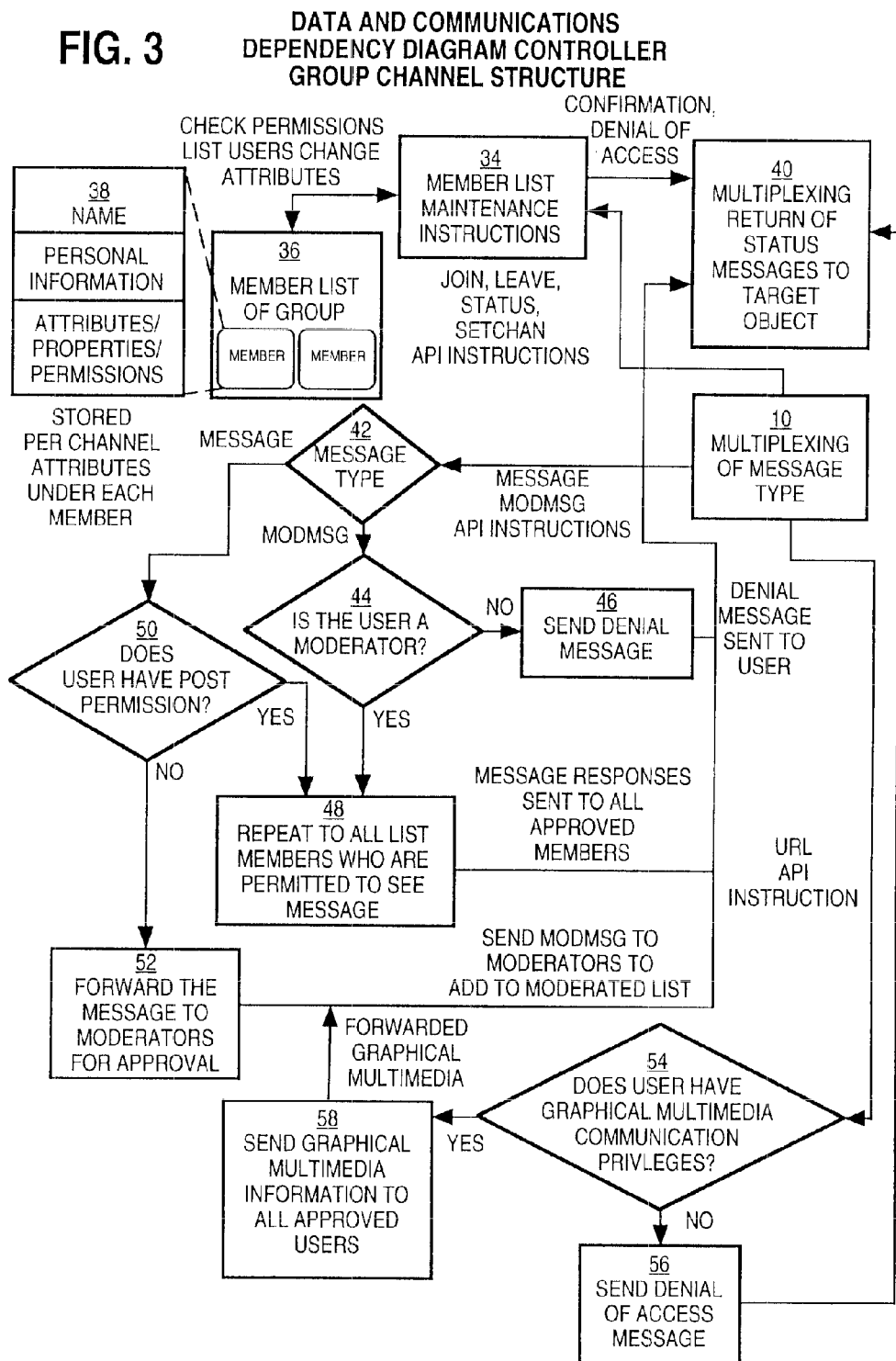
FIG. 3 is a data and communications dependency diagram for the controller group channel structure of the present invention.

Turning now to FIG. 3, a data and communications dependency diagram controller group channel structure is illustrated. Beginning from what is designated as a portion of Block 10 the logic flows to Block 34 to consider JOIN, LEAVE, STATUS, SETCHAN API instructions. Block 34 examines member list maintenance instructions, accessing Block 36 to check permissions, list users, and change attributes. Note the exploded window 38 shows a display of member information including a user's name, personal information, and attributes/properties/permissions (operations involving the subsequently discussed tokens), i.e., stored per channel attributes under each member. In any case, confirmation or denial of access is communicated via Block 40 for multiplexing return of status messages to a target object.

From the portion of Block 10, the logic flows to Block 42 for MESSAGE and MODMSG API instructions. Block 42 tests which of the two instructions were received, and for MODMSG, the logic flows to Block 44, which tests whether the user is a moderator. If the user is not a moderator, the logic flows to Block 46, which sends a denial message through Block 40. If, however, the in Block 44 the user is a moderator, the logic flows to Block 48 for a repeat to all list members who are permitted to see the message, via Block 40.

Returning to Block 42, if MESSAGE is detected, the logic flows to Block 50, which tests whether a user has post permission. If the user has post permission, the logic flows to Block 48, etc. If the user does not have post permission, the logic flows to Block 52 to forward the message to moderators for approval, via Block 40.

Additionally, the logic flows from Block 10 to Block 54 for a URL API instruction. Block 54 tests whether the user has graphical multimedia communication privileges, and if not, the logic flows via Block 56, which sends a denial message via Block 40. Otherwise, if the user does have graphical multimedia communications privileges in Block 54, Block 58 sends graphical multimedia information to all approved users via Block 40.

Figure 4:
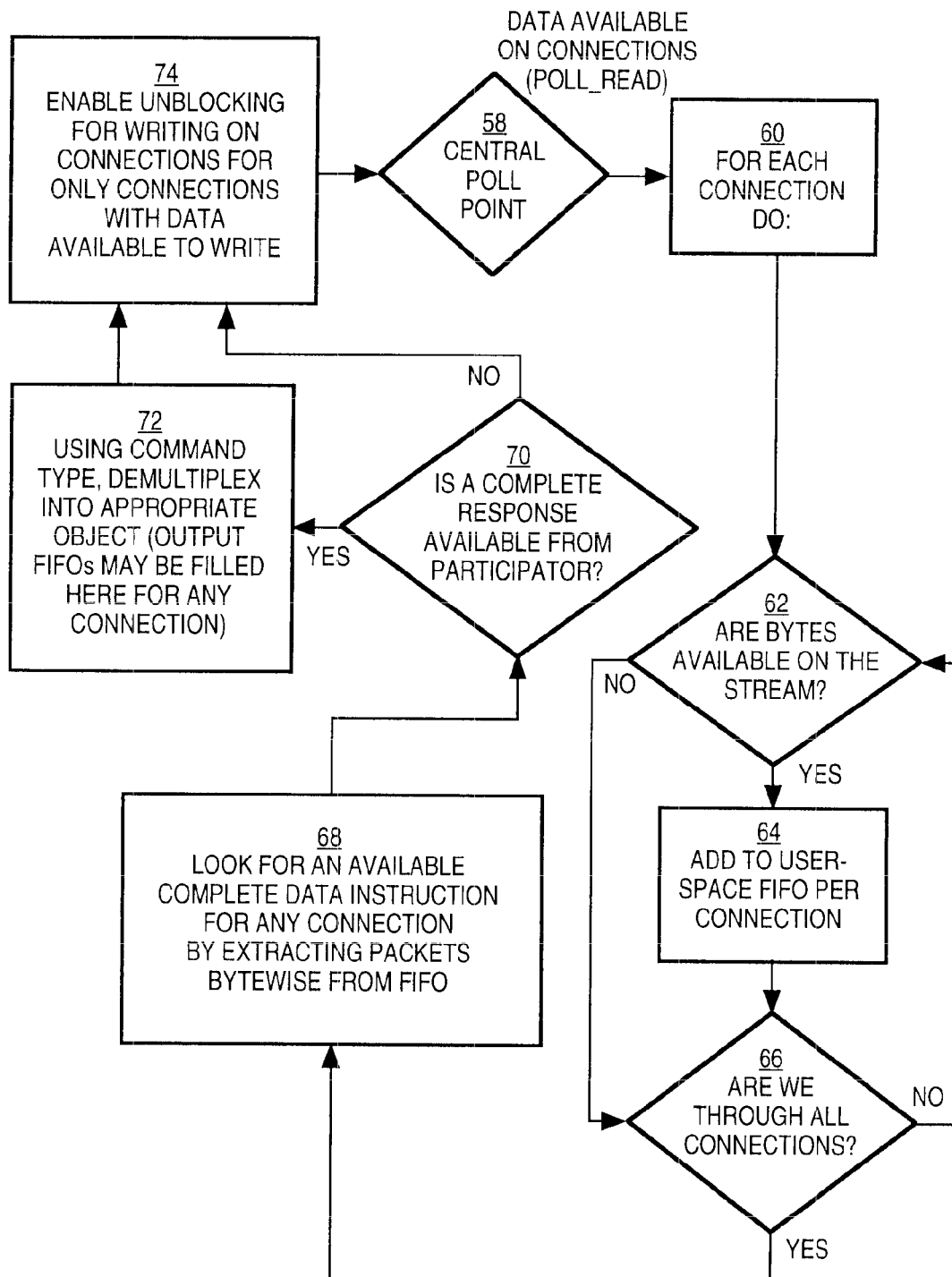
FIG. 4 is a flow chart of the central controller loop communications for the controller computer.

Turning now to FIG. 4, central controller loop communications is illustrated. For the data on central poll point 58 (see Appendix POLL_POINT), a "do" loop begins at Block 60 for each connection. Block 62 tests whether bytes are available on the data stream. If they are, the bytes are added to user space FIFO per connection at Block 64, leading to Block 66, which tests whether there are any more connections. Note that in FIG. 4, if there are no more bytes available in Block 62, the logic skips to Block 66, and if Block 66 is not finished with all connections, the loop returns to Block 62. When all connections have been completed in Block 62, the logic flows to Block 68, which looks for an available complete data instruction for any connection by extracting packets byte-wise from the FIFO. Thereafter, Block 70 tests whether there is a complete response available from the participator computer. If the response is complete, the logic flows to Block 72 which, using a command type, demultiplexes into an appropriate object (output FIFOs may be filled here for any connection). The logic from Block 72 joins the "no" branch from Block 70 at Block 74, which enables unblocking for writing connections for only connections with data available to write, looping back to Block 58.

Figure 5:
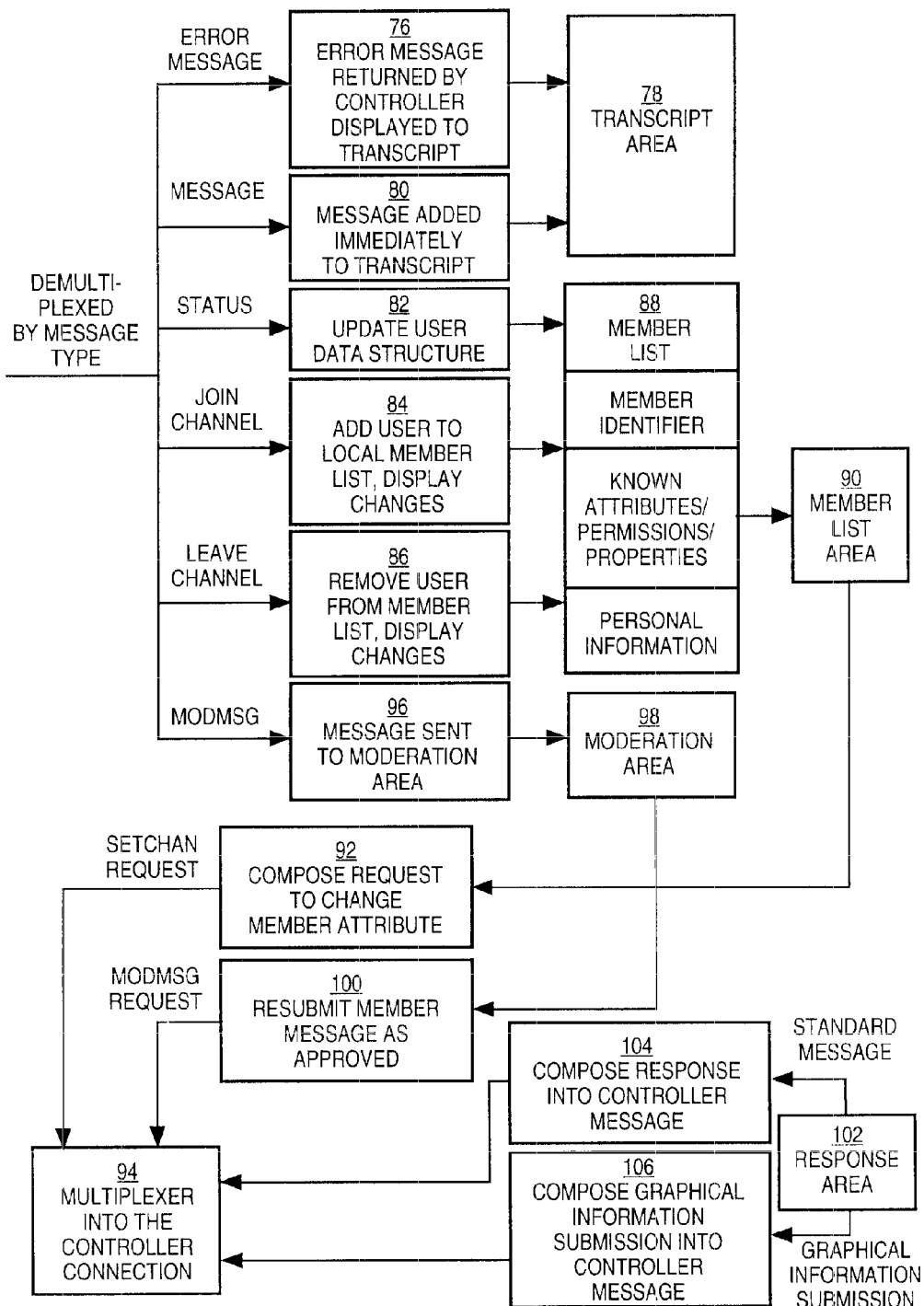
FIG. 5 is a client channel data structure and information flow diagram of the present invention.

FIG. 5 shows a client channel data structure and information flow diagram. From a message that is demultiplexed by message type, there are six possibilities: ERROR MESSAGE, MESSAGE, STATUS, JOINCHANNEL, LEAVECHANNEL, and MODMSG. ERROR MESSAGE is communicated to Block 76, where the error message is displayed to the transcript in the transcript area of Block 80. MESSAGE is communicated to Block 78 where the message is immediately added to the transcript in transcript area 78. STATUS is communicated to Block 82 to update user data structure; JOINCHANNEL is communicated to Block 84 to remove a user from the member list and display the change; and LEAVECHANNEL is communicated to Block 86. From Block 82, Block 84, and Block 88, the logic flows to Block 88, which includes a member list, a member identifier, known attributes/permissions/properties, and personal information. From Block 88, the logic proceeds to Block 90, a member list area, and on to Block 92 to compose a request to change a member attribute. This "SETCHAN request is then communicated to Block 94, which is the multiplexer leading to the controller computer connection.

MODMSG is communicated to Block 96, which sends the message to the moderation area of Block 98, and then to Block 100 to resubmit a member message as approved, thereby conveying a MODMSG request to Block 94.

Note that a response is prepared in the response area of Block 102. If the response is a standard message, it is conveyed to Block 104 to compose the response into a controller message, thereby sending a MESSAGE request to box 94. If, however, the message is a graphical information submission, the logic flows from Block 102 to Block 106 to compose the graphical information submission into a controller message, thereby sending a URL request to Block 94.

Figure 6:
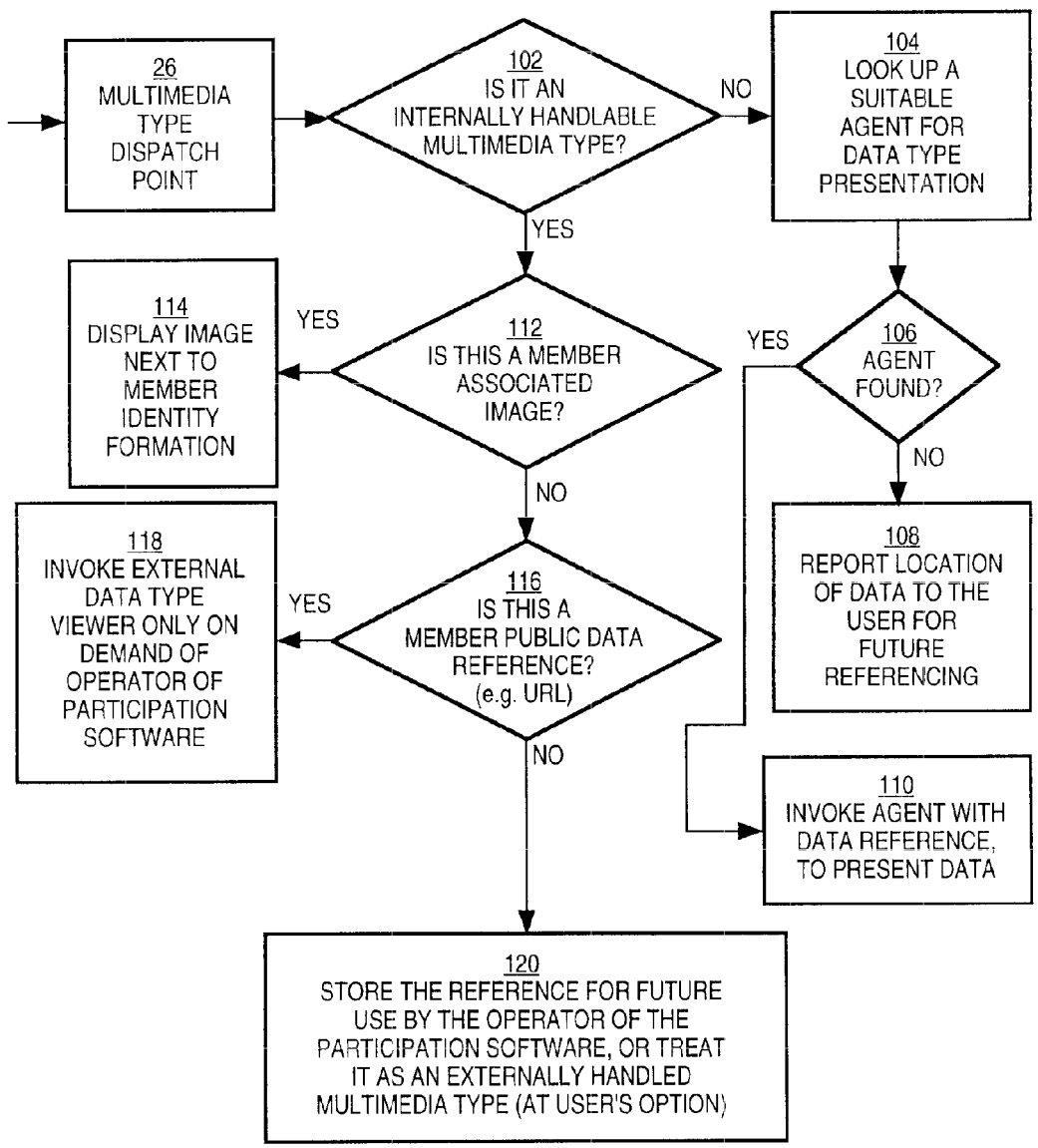
FIG. 6 is a participator software out-of-band multimedia information flow diagram of the present invention.

FIG. 6 is a participator software out-of-band multimedia information flow diagram, which begins with Block 26, the multimedia type patch point. Block 26 leads to Block 102, which tests whether there is an internally handlable multimedia type. If not, Block 104 looks up a suitable agent for data type presentation, which leads to Block 106, which tests whether an agent was found. If not, Block 108 reports location of data to the user for future referencing. If the agent is found in Block 106, the logic flows to Block 110, which invokes the agent with a data reference to present the data.

If the multimedia type is internally handlable from Block 102, the logic flows to Block 112, which tests whether this is a member associated image. If it is a member associated image, Block 114 displays the image next to member identity information, and if it is not, the logic flows to Block 116, which tests if this is a member public data reference (e.g., a URL). If a URL is detected at Block 116, Block 118 invokes an external data type viewer only on demand of the operator of the participator software, and otherwise Block 120 stores the reference for future use by the operator of the participator software, or treats the reference as an externally handled multimedia type (at the user's option).

With further regard to the manner of interaction between the controller computer 3 and the participator computers 5, and their respective computer programs 2 and 4, includes a moderation capability that is controlled, or arbitrated, pursuant to system 1 recognizing user identity. Note that using the user identity for moderation purposes is a use additional to the use of the user identity for security purposes.

One embodiment of the present invention is to bring chat capability to the internet and World Wide Web. However, another embodiment involves non-internet relay chat. In either embodiment, System 1 is state driven such that synchronous and asynchronous messages can be communicated. For an asynchronous notification, each message is sent through the system 1 (API), which updates the information on the output device of the participator computers 5. For a synchronous notification, a participator computer 5 must interrogate the system 1 for a message.

With regard to the arbitrating of the controller computer 3 is directed by the controller computer program 2 to use "identity tokens", which are pieces of information associated with user identity. The pieces of information are stored in memory 11 in a control computer database, along with personal information about the user, such as the user's age. The control computer database serves as a repository of tokens for other programs to access, thereby affording information to otherwise independent computer systems. In the database, the storage of tokens can be by user, group, and content, and distribution controls can also be placed on the user's tokens as well as the database.

Each token is used to control the ability of a user to gain access to other tokens in a token hierarchy arbitration process. The arbitration also includes controlling a user's ability to moderate communications involving a group or subgroup of the participator computers 5. Once in a group, temporary tokens are assigned for priority to moderate/submoderate groups (a group is sometimes known as a channel in multiplexing terminology).

Accordingly, tokens are used by the controller computer 5 to control a user's group priority and moderation privileges, as well as controlling who joins the group, who leaves the group, and the visibility of members in the group. Visibility refers to whether a user is allowed to know another user is in the chat group.

Tokens are also used to permit a user's control of identity, and in priority contests between 2 users, for example, a challenge as to whether a first user can see a second user.

Censorship, which broadly encompasses control of what is said in a group, is also arbitrated by means of the tokens. Censorship can control of access to system 1 by identity of the user, which is associated with the user's tokens. By checking the tokens, a user's access can be controlled per group, as well as in giving group priority, moderation privileges, etc.

Censorship also can use the tokens for real time control of data (ascii, text, video, audio) from and to users, as well as control over multimedia URLs—quantity, type, and subject.

With regard to controlling communications in a group (which is in essence a collection of user identities), control extends to seeing messages, seeing the user, regulating the size of the communication, as well as the ability to see and write to a specific user. Control further extends to the ability to send multimedia messages.

Note that tokens for members in group can involve multiples formed in real time, say, within the span of a conversation. For example, for private communication, tokens are immediately formed to define a group of 2 users. Hierarchical groups within groups can also be formed, with each inheriting the properties of the group before it. Thus, a subgroup can include up to all members or more by adding any surplus to the former group.

With further regard to the controller computer 3, e.g., a server, information is controlled for distribution to the user interfaces at selected ones of the participator computers 5. The controller computer program, in one embodiment, can be a resident program interface (such as a JAVA application). There can be a token editor object (window/tear down, etc.) per group, private communication, user, channel listings, user listings, etc. Each can link up in a token hierarchy for arbitration control.

The controller computer 5, by means of the controller computer program 2, keeps track of states and asynchronous messages as well as generating a synchronous message as a user logs in or interrogates system 1.

With regard to multimedia information messages 8, such messages are of independent data types, e.g., audio/video data types. The content of the message (e.g., a URL) permits the System 1 to automatically determine the handling of the message: either the Controller Computer 3 passes the content of Message 8 directly, or the Controller Computer 3 determines from the Message 8 how to find the content, say via Netscape. Accordingly, Message 8 can communicate video and sound (or other multimedia, e.g., a URL) to users, subject only to the server arbitration controls over what can be sent.

Figure 7:
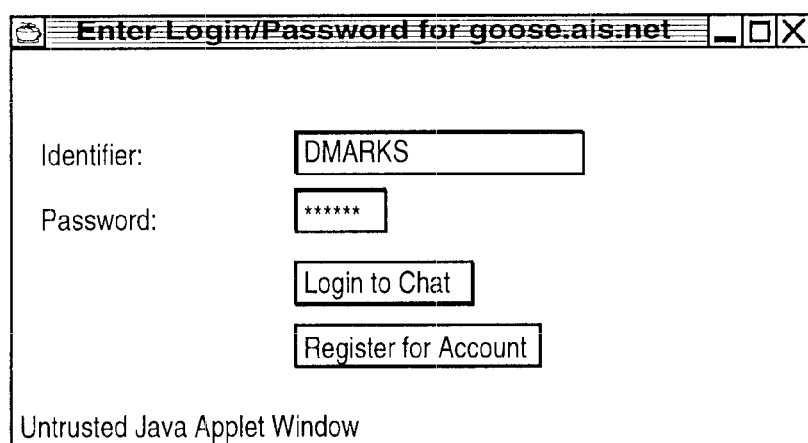
FIG. 7 is an illustration of a login/password screen of the present invention.

Turning now to an illustration of using the invention, the session starts with verifying the user's identity (at FIG. 7). The login/password screen is shown, and the user enters his/her assigned login/password combination and clicks the "Login To Chat" button. If the password was entered correctly, a confirmation box appears on the screen.

Figure 8:
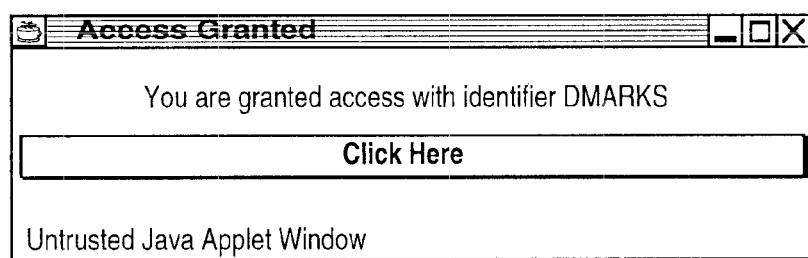
FIG. 8 is an illustration of a confirmation screen of the present invention.

Then the channel list area is shown at FIG. 8. The Channel List area is a window which shows a list of all of the groups currently on the server in active communication. Because no one is yet connected in this example, there are no groups currently available on the screen.

Figure 9:
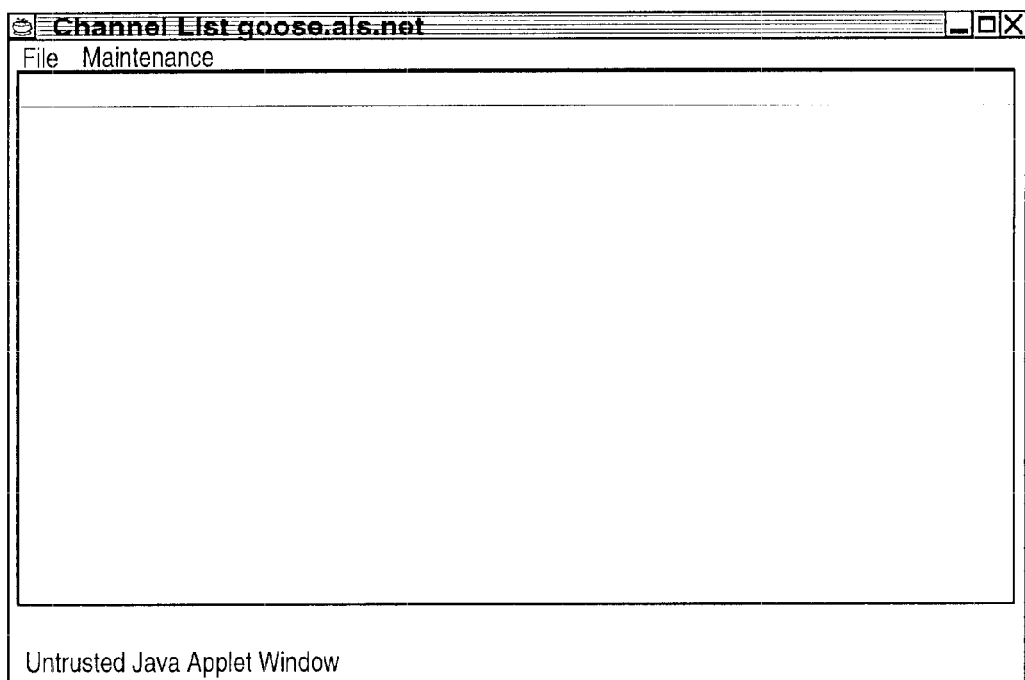
FIG. 9 is an illustration of a channel list area screen of the present invention.

To create a new group, the "New Channel" option is selected from a pull-down menu (at FIG. 9). The name of the channel is entered by the input device 7.

Figure 10:
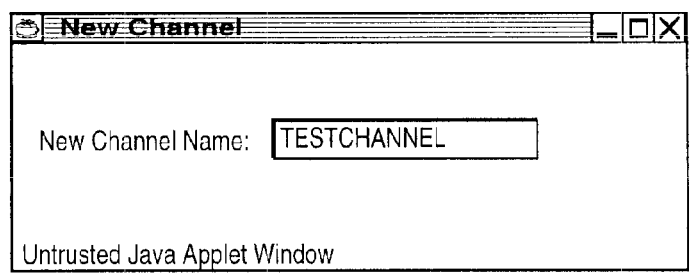
FIG. 10 is an illustration of a New Channel option pull-down menu screen of the present invention.

If the user has permission (this one does), a new channel is created for the group (at FIG. 10). The window that displays the channel area has three regions: the bottom region, where responses are entered; the largest region, where a transcript of the communication is followed; and the rightmost region, which lists the group's current members. This list is continuously updated with asynchronously generated status messages received immediately when a new member joins the group. Only "DMARKS" is currently in this group. The "MWU" is the properties currently associated with DMARKS—the ability to moderate, write to the channel, and send multimedia messages.

Figure 11:
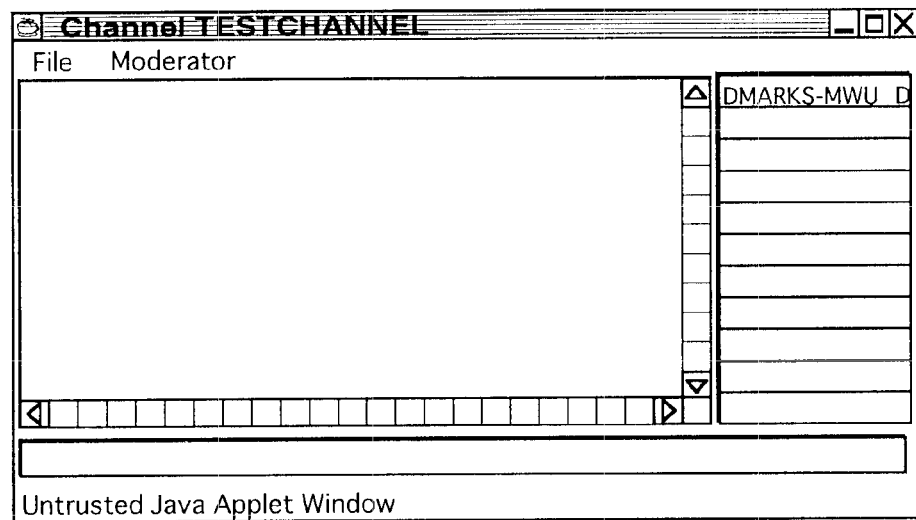
FIG. 11 is an illustration of a member on a new channel screen of the present invention.

A new member has joined the channel, and the member list status area is updated right away (at FIG. 11). This new member has a login of "ME."

Figure 12:
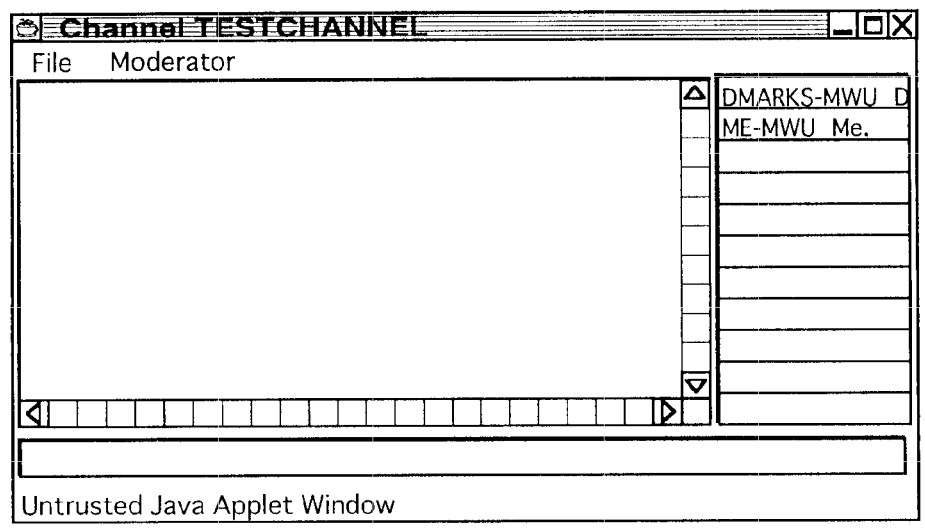
FIG. 12 is an illustration of a second member on the new channel screen of the present invention.

The user DMARKS now types "hello there" into the response area and presses RETURN (at FIG. 12). This message is passed to the controller computer 5, which sends the message to all channel members, i.e., those using participator computers 5, including DMARKS.

Figure 13:
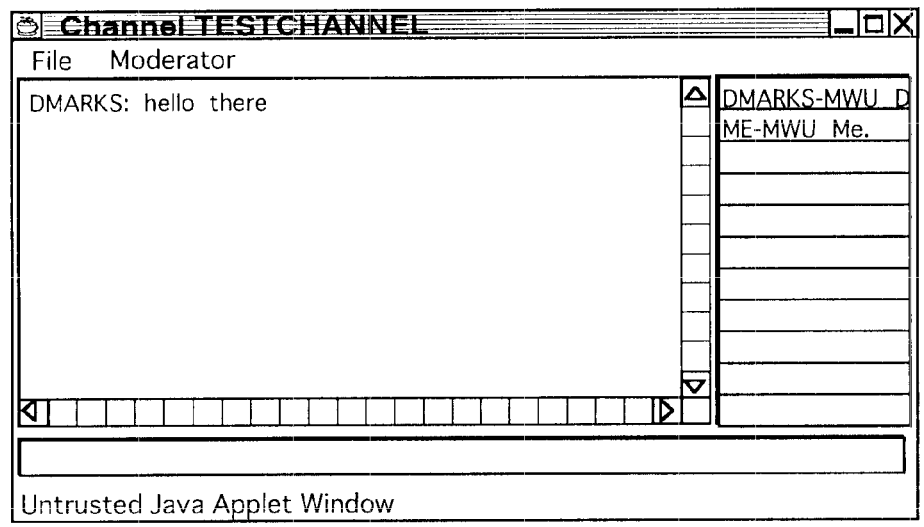
FIG. 13 is an illustration of a communication on the new channel screen of the present invention.

The user ME now sends a message to the controller: "hi there" (at FIG. 13). This message is also sent to all members by the controller computer 5. Now user DMARKS clicks (using input device 7, a mouse) on the name of the user "ME" in the member list window. The participator software 4 will now create a private message window, so that the users ME and DMARKS can exchange private messages. Private messages are only sent to the intended recipient by the controller, and no one else.

Figure 14:
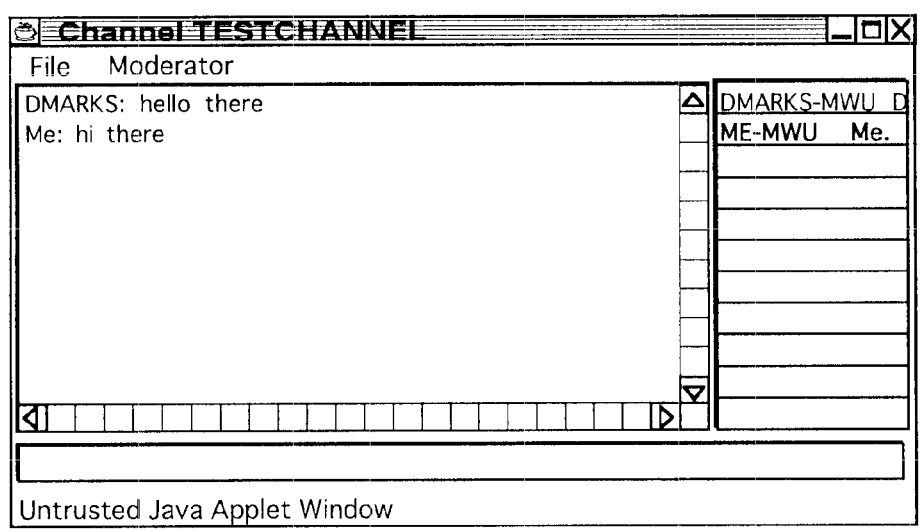
FIG. 14 is an illustration of a private message window on the new channel screen of the present invention.

A private message window appears in response to DMARKS's request to open private communications with ME (at FIG. 14). Now DMARKS types a message into the private message window's response area to ME: "this message is seen only by the user ME." When complete, the participator software 4 will forward this message to the controller computer 3.

Figure 15:
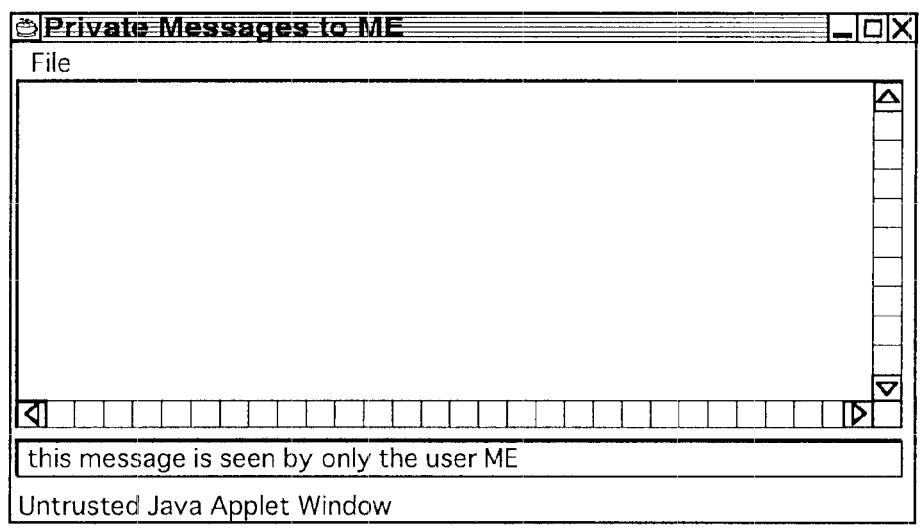
FIG. 15 is an illustration of a private message displayed on the private message window on the new channel screen of the present invention.

In response, the user ME has entered "This is the private message response that is only seen by the user DMARKS," which has been forwarded to user DMARKS (at FIG. 15). This message is displayed immediately on DMARKS's window.

Figure 16:
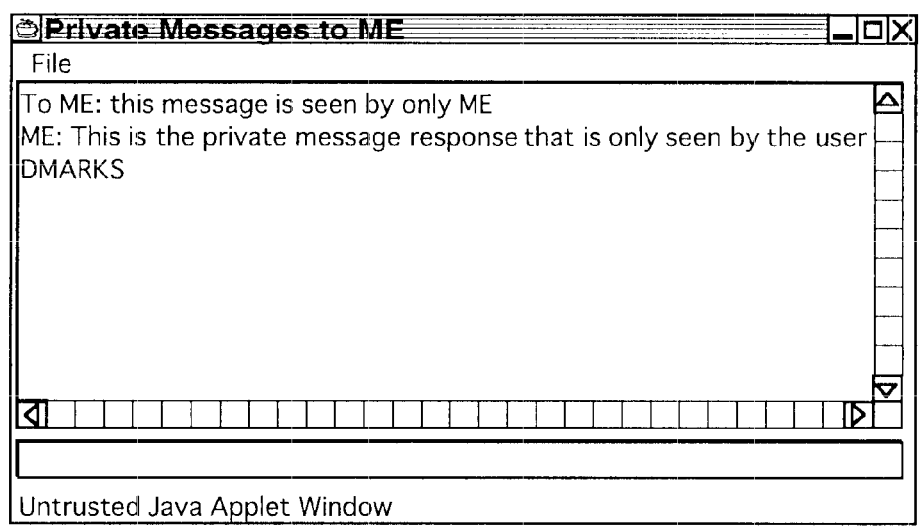
FIG. 16 is a further illustration of the private message on the private message window on new channel screen of the present invention.

DMARKS now returns to the channel window for the group "TESTCHANNEL" (at FIG. 16). To modify the permission attributes associated with user ME on the channel TEST CHANNEL, DMARKS (who is a moderator of the channel), clicks on the user ME in the member list to select ME, pulls down the Moderator menu, and selects "Toggle Moderator." This removes the moderator privileges from ME.

Figure 17:
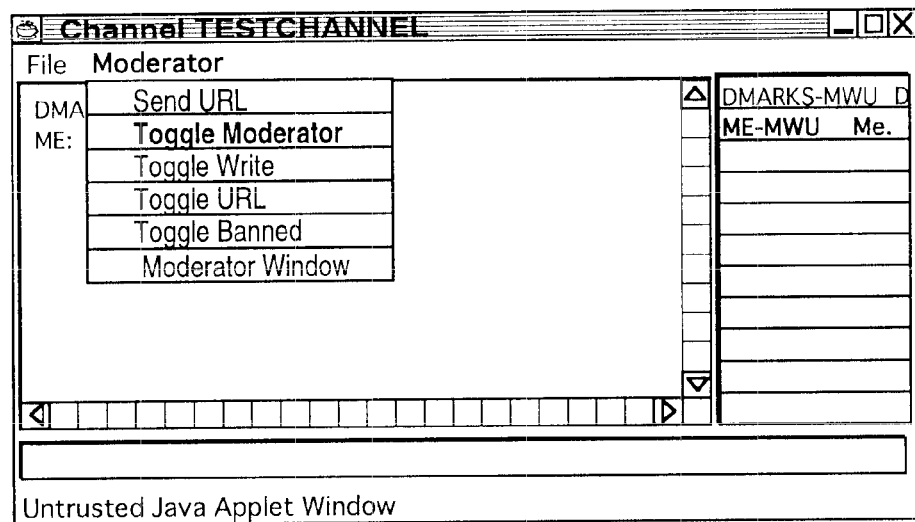
FIG. 17 is an illustration of an attribute revocation on the new channel screen of the present invention.

As a result of the attribute revocation, the "M" has disappeared from next to ME's name in the member list (at FIG. 17), indicating that the property is no longer associated with the user ME.

Figure 18:
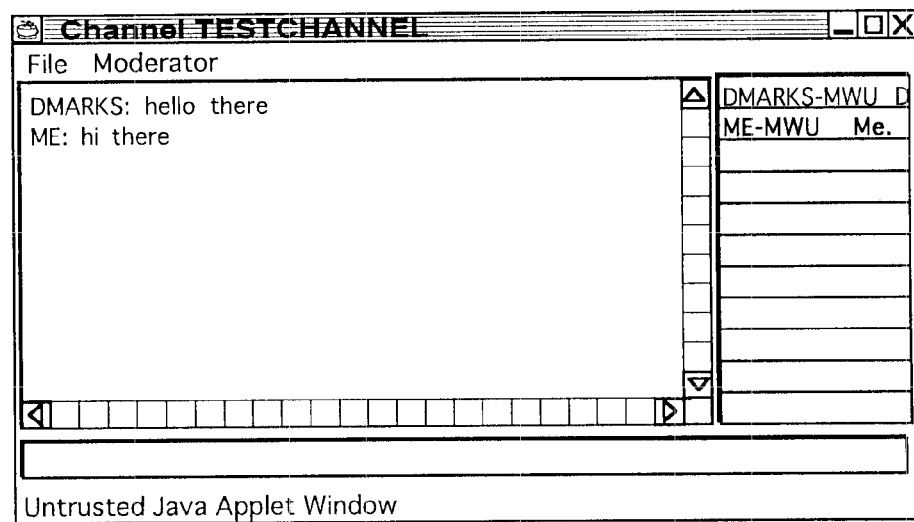
FIG. 18 is a further illustration of the new channel screen of the present invention.

Now DMARKS returns to the Channel List window (at FIG. 18). DMARKS wishes to fully moderate the contents of the channel TESTCHANNEL, censoring all unwanted communications to the channel. DMARKS returns to the channel list, and selects the channel TESTCHANNEL by clicking on its name in the channel list.

Figure 19:
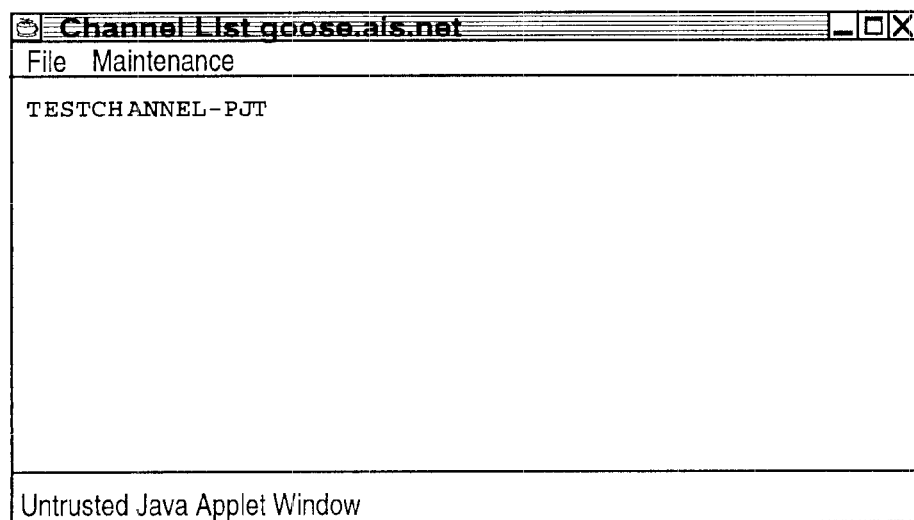
FIG. 19 is an illustration of the channel list window screen of the present invention.
Figure 20:
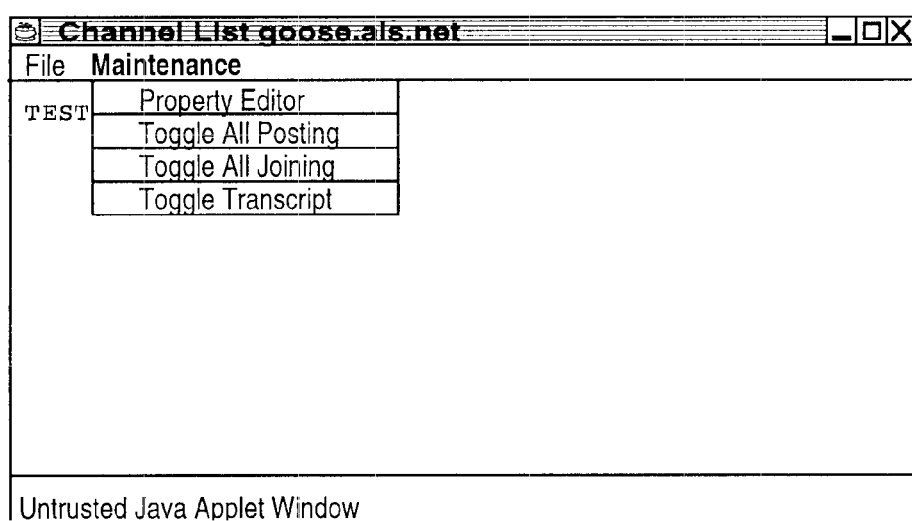
FIG. 20 is an illustration of the toggle posting option on a screen of the present invention.

Now DMARKS selects the "Toggle All Posting" option in the Maintenance pull-down menu (at FIG. 19). This will turn off the channel property "posting," (or sending communications to the channel without moderator approval) which will be indicated by the removal of the letter "P" from next to the name TESTCHANNEL (at FIG. 20).

Figure 21:
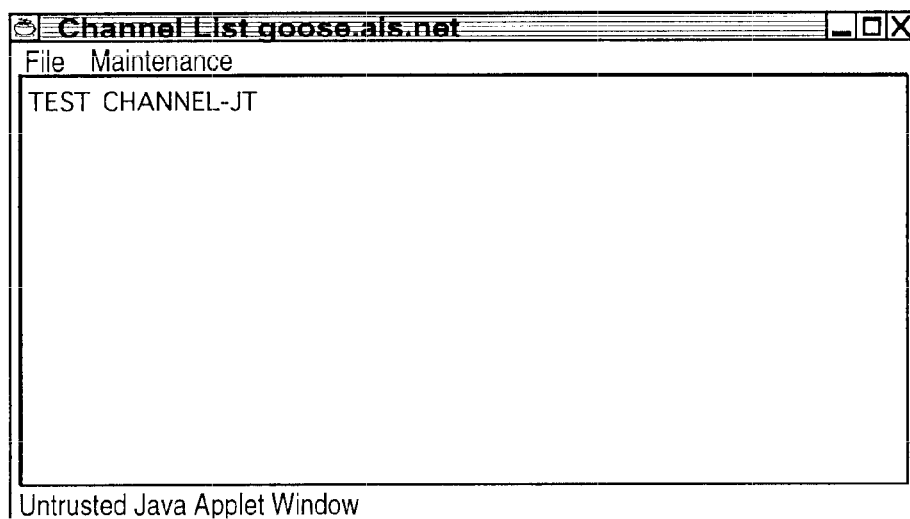
FIG. 21 is an illustration of a moderated version of the new channel screen of the present invention.

Now the letter "P" is removed from after the name TESTCHANNEL in the Channel List window (at FIG. 21), indicating that this channel is now moderated and will only have free posting ability by designated members.

Figure 22:
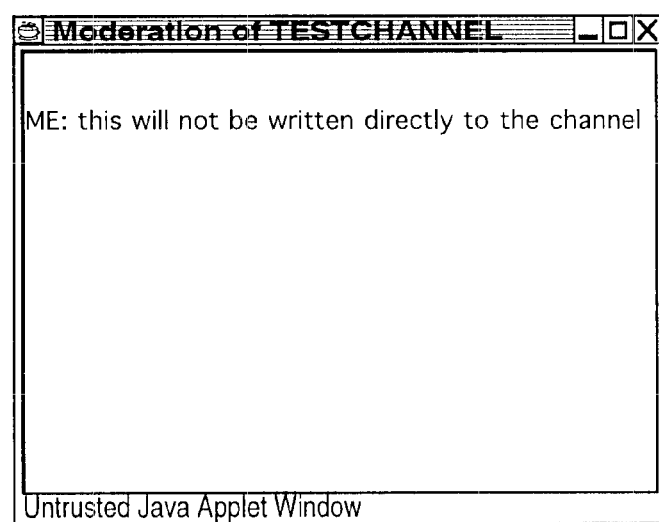
FIG. 22 is an illustration of a communication on a moderation window screen of the present invention.

Now, type user ME (who is also on channel TESTCHANNEL) wishes to send communications: "this will not be written directly to the channel" (at FIG. 22). The controller, instead of sending it immediately to the channel to be seen by all members, will instead forward the message to the moderators for approval. The moderator, DMARKS, will then see the message on the Moderation Window, which provides a preview of any messages to be sent. To approve a message for general viewing, DMARKS now clicks on the message.

Figure 23:
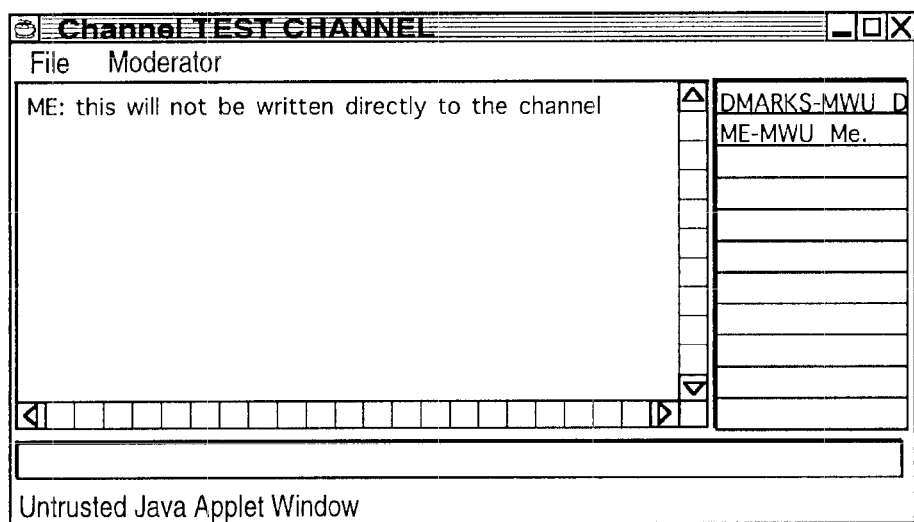
FIG. 23 is an illustration of the communication passed on to the moderated version of the new channel screen of the present invention.

Now that DMARKS has clicked directly on the message, it is displayed inside the group's Channel window for all members to see (at FIG. 23).

Figure 24:
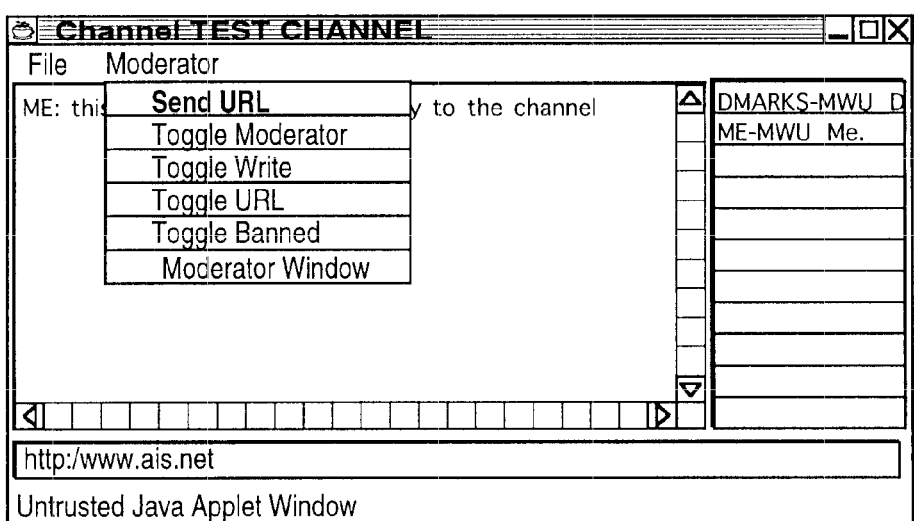
FIG. 24 is an illustration of a communication, for sending a graphical multimedia message, on to the moderated version of the new channel screen of the present invention

DMARKS now wishes to send a graphical multimedia message. This implementation sends graphical multimedia images by allowing a channel member to specify an Internet URL of a graphical multimedia resource to be presented to the group members. In this example, DMARKS wishes to send the URL "http://www.ais.net" (corresponding to the World Wide Web home page of American Information Systems, Inc.) to the channel members. DMARKS enters the URL into the response window, and selects "Send URL" from the Moderator pull-down menu (at FIG. 24).

Figure 25:
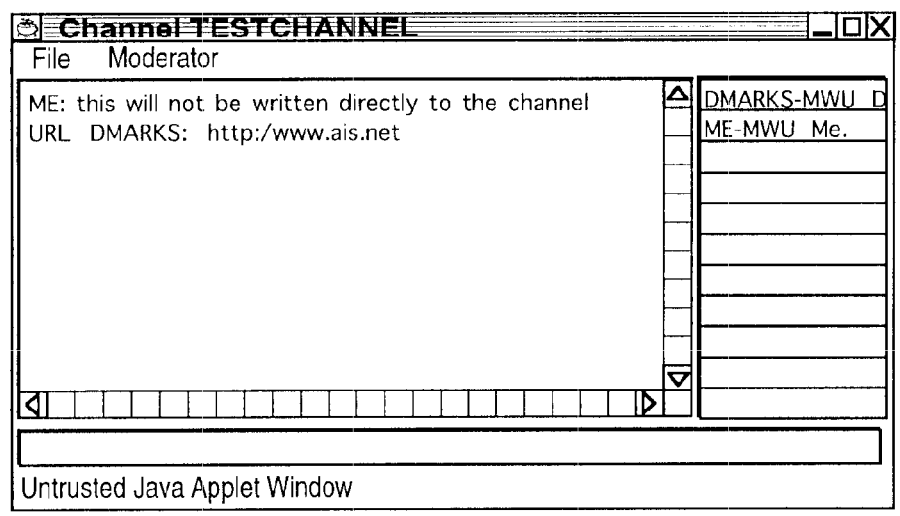
FIG. 25 is an illustration, showing the name of the URL, on a moderated version of the new channel screen of the present invention.
Figure 26:
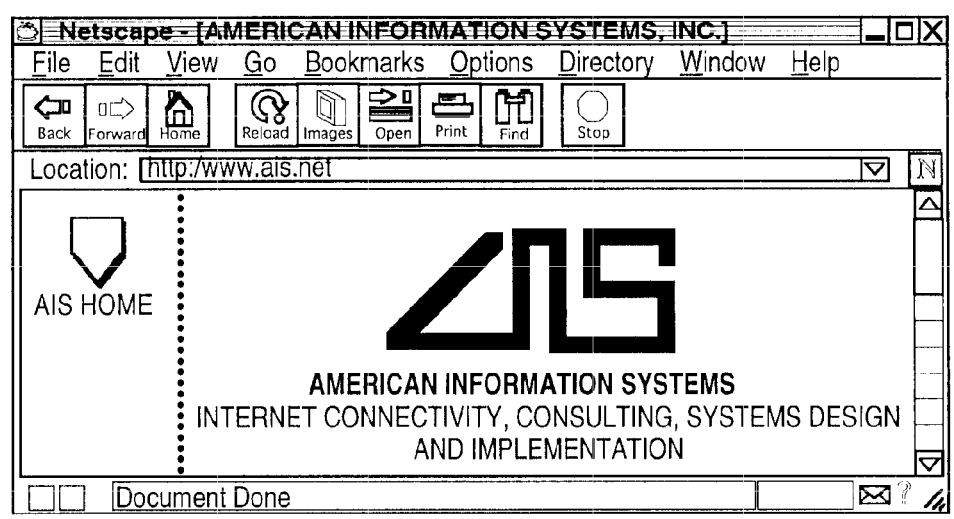
FIG. 26 is an illustration of data associated with the graphical multimedia message on a moderated version of the new channel screen of the present invention.

The controller computer 5 now passes the URL to the channel members. This participator software 4 performs two actions in response to the graphical multimedia display request. The first is to put the name of the URL onto the transcript of the group's channel, so that it can be read by group members. The second response is to have the participator software show the data associated with the graphical multimedia message in a human interpretable way (at FIG. 25). To do this, the participator software 6 either uses built in rules to decide how the graphical multimedia data is to be presented, or locates another program suitable to present the data. In this case, the software 6 is utilizing Netscape Navigator, a program for displaying graphical multimedia documents specified by a URL (at FIG. 26). Inside the Navigator window, the graphical multimedia content, the home page of AIS, is shown.

Figure 27:
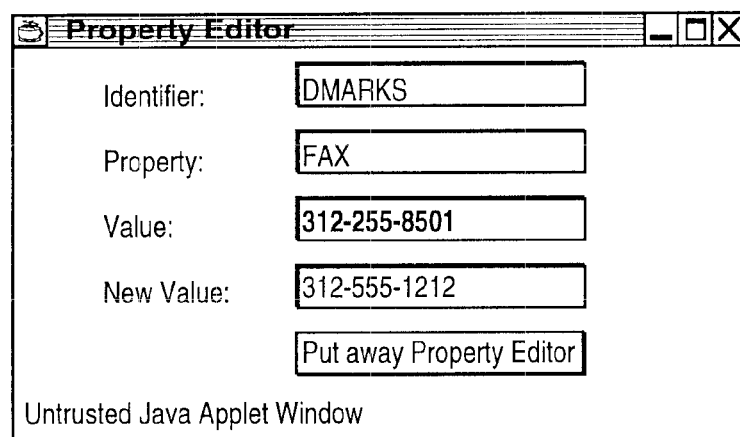
FIG. 27 is an illustration of a proprietary editor, suitable for a dialog to change tokens, on a screen of the present invention.

Finally, DMARKS wishes to manually modify the attribute tokens associated with the user (at FIG. 27). The user invokes the Property Editor dialog, which allows the user to view and change the tokens associated with a user. A property of a given user is determined by the Identifier and Property names. An old value of the property is shown, and a token value can be changed in the "New Value" field. With this property editor, a user with sufficient permissions (tokens) can change any of the tokens or security parameters of any user, or a user's ability to change security parameters can be restricted.

Figure 28:
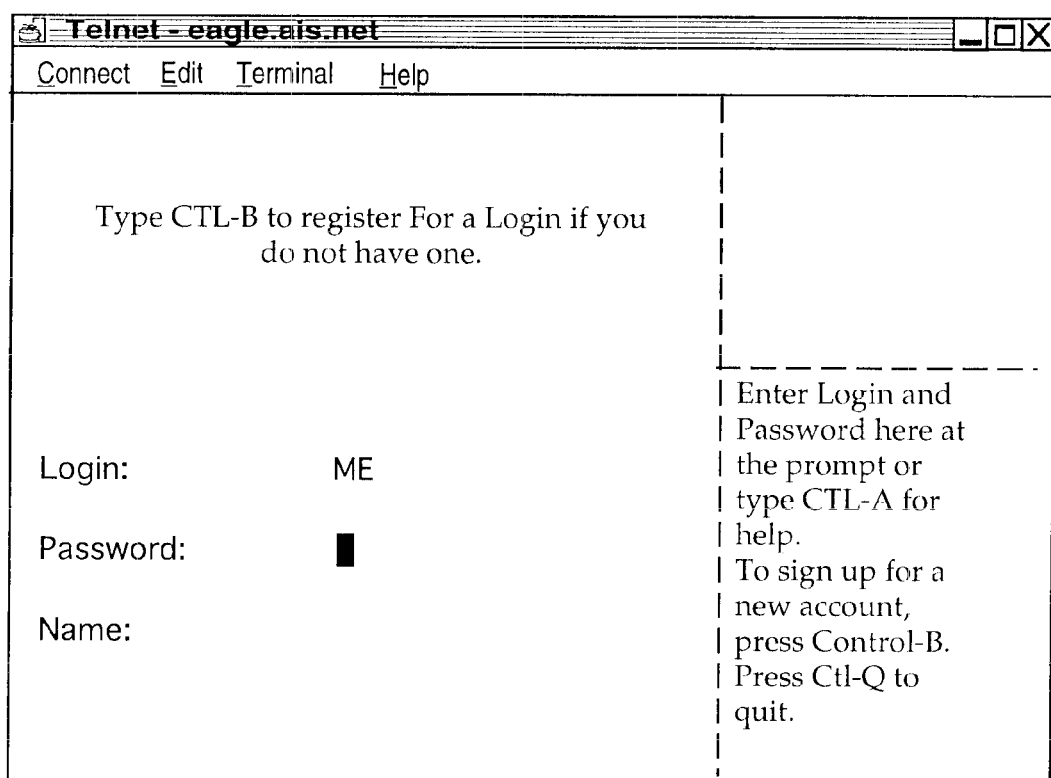
FIG. 28 is an illustration of a text-based interface login/password screen of the present invention.

To start with an alternate embodiment using a text-based interface, a user is presented by the login/password screen (at FIG. 28). This screen is where a user enters the information that proves his/her identity. The user must now enter his/her login and password to identify themselves.

Figure 29:
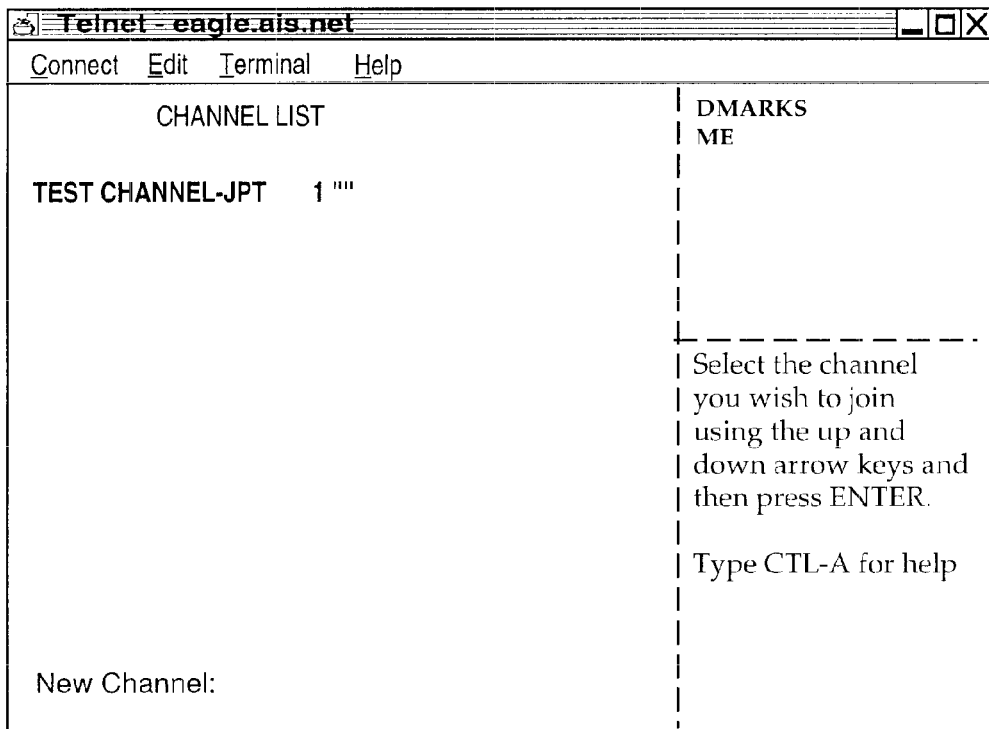
FIG. 29 is an illustration of a text-based interface group screen of the present invention.
Figure 30:
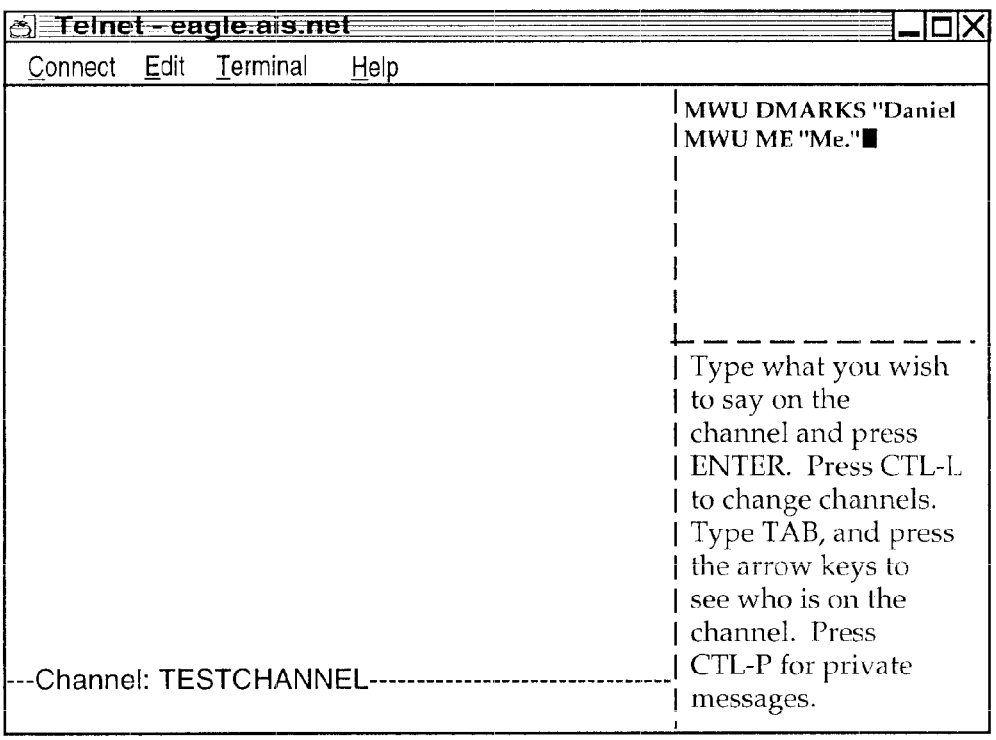
FIG. 30 is another illustration of a text-based interface group screen of the present invention.

After the user has been identified by the controller the Channel List screen appears (at FIG. 29). The names of channels and their associated properties are shown on this screen. By using the arrow keys and highlighting the desired channel, ME may enter any publicly joinable group. Currently, there is only one group TESTCHANNEL, which ME will join.

Now the screen for the channel TESTCHANNEL appears (at FIG. 29). The screen is split into four regions. The bottom left region is the response line, where messages users wish to enter appear. The upper left region is the transcript area where the communications of the group's channel appear as they occur. The upper right region is the Member List region, where a continuously updated list of members' names appear, with their attributes.

Figure 31:
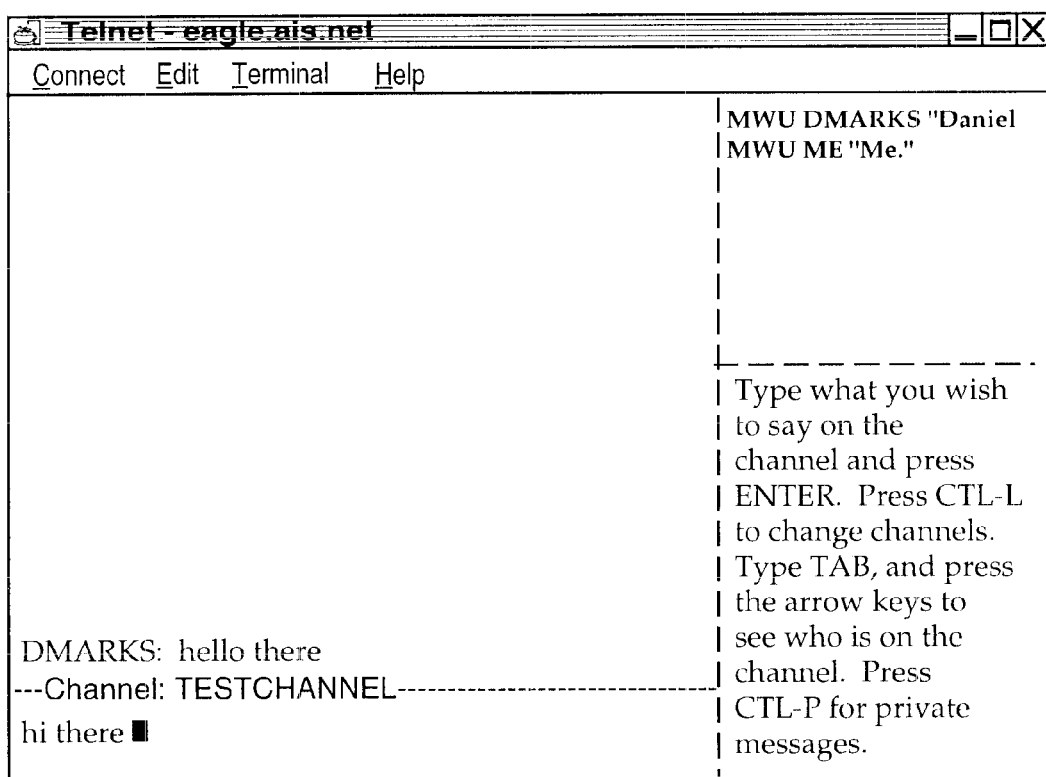
FIG. 31 is another illustration of a text-based interface group screen of the present invention.

A message appears in the transcript area. The controller has forwarded a message to the group from DMARKS, "hello there" (at FIG. 31), which is seen by all members of the group, including ME. Now ME will respond, by entering "hi there" into the response area.

When ME is finished entering his response, the participator software forwards the response to the controller, which sends it to the members of the channel. In the transcript area, the participator software notifies the user that it has received a private message from DMARKS, which is waiting inside the private message screen. To see the private message, ME presses the private message screen hot key.

Figure 32:
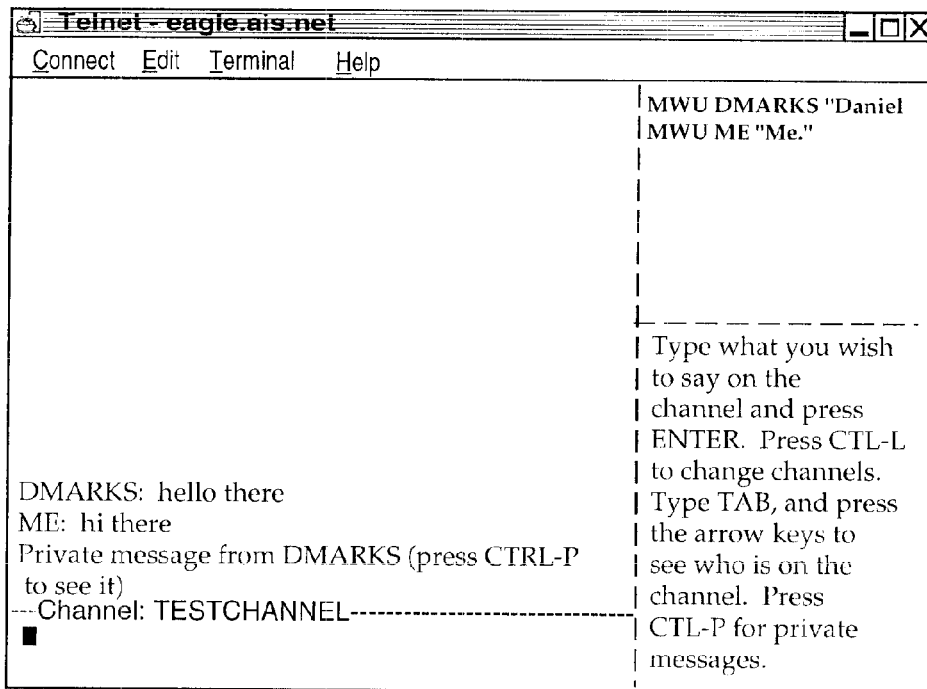
FIG. 32 is an illustration of a text-based interface private message screen of the present invention.

A private message screen appears (at FIG. 32), and the private message from DMARKS is at the bottom of the transcript area. Now to reply, ME types his response into the response area.

Figure 33:
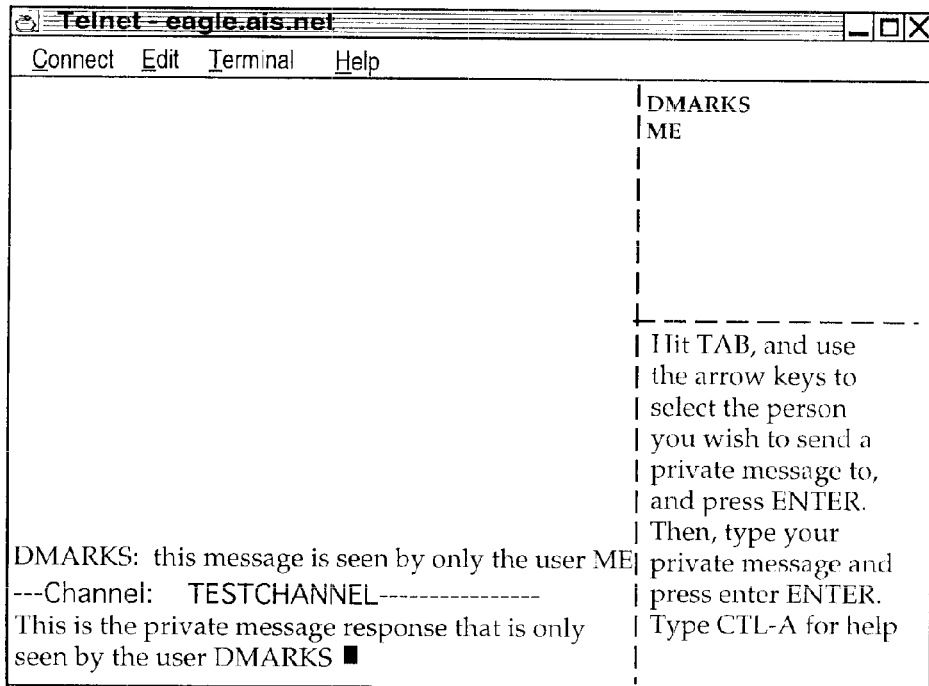
FIG. 33 is another illustration of a text-based interface private message screen of the present invention.

Now ME will return to the screen for the channel TESTCHANNEL. The member list area has changed because DMARKS has revoked ME's moderator permission. ME is no longer permitted to see the permissions of other users, so this information has been removed from his display (at FIG. 33). The only information he can see now is who is moderator (at FIG. 34). A "*" next to the identifier of a member of the group indicates the member is a moderator of the group. ME is no longer a moderator, and therefore a "*" does not appear the identifier ME.

To further exemplify the use of the present invention, the following is a transcript of communications produced in accordance herewith.

POWERQUALITY JOHNMUNG: unclear about meaning of "first contingency"
POWERQUALITY SAM: mike, that is correct on IEEE 519
POWERQUALITY SKLEIN: In assessing network security (against outage) the first contingencies are tested to see how the power system should be reconfigured to avoid getting a second contingency and cascading into an outage.
POWERQUALITY MSTEARS: These outages point out the need for reliability as part of the overall customer picture of PQ
POWERQUALITY BRIAN: Hi Jennifer, hit crt-p for private message
POWERQUALITY SKLEIN: In simpler terms, a single point failure shouldn't crash the system.
POWERQUALITY SKLEIN: Are we all chatted out?
POWERQUALITY ANDYV: brian, johnmung has been banned!!! why?
POWERQUALITY BRIAN: no way, new subject
POWERQUALITY BRIAN: just a sec, andy
POWERQUALITY BRIAN: No banning on this channel, John is back on
POWERQUALITY TKEY: ieee 519 limits the harmonic current a customer can inject back into the pcc and limit the vthd the utility provides at the PCC
POWERQUALITY JOHNMUNG: thanks guys, for unbanning me—i've been thrown out of better places than this!
POWERQUALITY BRIAN: New subject . . . now . . .
POWERQUALITY BRIAN: good one john . . . :)
POWERQUALITY MSTEARS: For critical facilities dual feeds or other backup capability need to be economically evaluated to keep the facility in operation
POWERQUALITY SAM: John, I remember that club very well
POWERQUALITY JOHNMUNG: question: please comment on frequency of complaints involving spikes, sags or harmonics
POWERQUALITY WARD: Problems caused by sags is the main complaint.
POWERQUALITY BRIAN: What subject does anyone want to see the next chat
POWERQUALITY WARD: Surges is probably next; harmonics really don't cause that many problems, although they are certainly there.
POWERQUALITY ANDYV: what is the solution ward?
POWERQUALITY TKEY: Agree they are the most frequent (sags) and the panel sesion on the cost of voltage sags at PES drew 110 people
POWERQUALITY SAM: harmonics tend to be an interior problem within a facility, rather than on the distribution system
POWERQUALITY WARD: The best solution is making the equipment less susceptible to sags. This requires working with the manufacturers.
POWERQUALITY ANDYV: won't that cost more
POWERQUALITY MSTEARS: The complaint of surges covers many things in the customers eyes sags have become a real problem because they are harder to resolve
POWERQUALITY GRAVELY: John—The latest EPRI results confirms the 90+ % of the time
SGS are the problem and short term ones.
POWERQUALITY WINDSONG: What is the topic for the 25??
POWERQUALITY WARD: Each problem can be dealt with as it occurs, but the time involved gets very expensive.
POWERQUALITY JOHNMUNG: making equipment less susceptible causes legal problems for manufacturers—as each improvement can be cited by compinant as example of malfeasance
POWERQUALITY WARD: AndyV: The cost to the manufacturer increases. The overall cost to everyone involved decreases.
POWERQUALITY TKEY: customer pays any way you cut it, if the eqpt is more immune customers pay only once instead of every time the process fails
POWERQUALITY BRIAN: The topic is regarding Power Quality
POWERQUALITY BRIAN: This chat is available for everyone 24 hours a day POWERQUALITY ANDYV: ddorr>>will the manufacturer spend more to produce a better product
POWERQUALITY WARD: And as Tom says, the cost to the customer is far less.
POWERQUALITY BRIAN: This chat will be functioning 24 hrs/day
POWERQUALITY BRIAN: please usae it
POWERQUALITY BRIAN: The next panel discussion is Nov 15th
POWERQUALITY WARD: Andy, that's where standards come in.
POWERQUALITY SKLEIN: Is the customer capable of resolving the fingerpointing among the manufacturers and utilities?
POWERQUALITY DDORR: andy, only if the end userss create a market for pq compatible eqpt by demanding better products
POWERQUALITY MSTEARS: The manufacturers problems in including fixes is being competitive with some who doesn't provide the fix
POWERQUALITY ANDYV: how will we educate the general consumer?
POWERQUALITY GRAVELY: Is it possible to have a basic theme topic or some core questions for 15 Nov chat?
POWERQUALITY WARD: Stan, the customer cannot be expected to resolve the fingerpointing. The manufacturers and utilities need to work together.
POWERQUALITY ANDYV: about power quality and reliability?
POWERQUALITY SKLEIN: If electric power is going to be treated as a fungible commodity, there has to be a definition. Like, everyone knows what number 2 heating oil is.
POWERQUALITY SAM: Ideally a manufacturer would not be able to compete if they don't add the protective function in their products, but alot more public education is required before we get to this point.
POWERQUALITY WARD: Andy, there are many ways to educate the customers, but they require a lot of contact between the utility and the customers. The Western Resources Power Technology Center in Wichita is doing it, just as an example.
POWERQUALITY DDORR: standard power vs premium power is one solution as is std qpt vs Pq compatible eqpt
POWERQUALITY SKLEIN: I want to buy number 2 electric power and to be able to check the nameplates of my appliances to be sure they can take it. Just like I buy regular gasoline.
POWERQUALITY MSTEARS: Sam—I agree, that is partly the utilities responsibility since we serve the customers
POWERQUALITY BBOYER: What differentiates number 2 from number 1?
POWERQUALITY SKLEIN: I used the analogy of number 2 heating oil. I don't know what number 1 heating oil is.
POWERQUALITY DDORR: Number two has cap switching and all the normal utility operational events while number one is much better
POWERQUALITY SKLEIN: Perhaps we can just say regular vs high test.
POWERQUALITY SAM: mike, yes a joint effort between the utiliy, manufacturer and standards jurisdictions is a goal for utilicorp as we move forward with offering from our strategic marketing partners, and bring PQ technologies to the public
POWERQUALITY TKEY: We are finding that many mfgrs want to produce pq compatible equipment, but they have no clue as to what to test for
POWERQUALITY ANDYV: Torn>>will the IEC standards help?
POWERQUALITY TKEY: Its up to the utility to help define normal events IEC will take time
POWERQUALITY SKLEIN: You can't have a commodity product with all the variation in specifications we have been discussing. It has to be regular, premium, and super premium or it won't work.
POWERQUALITY JOHNMUNG: Tom as a former manufacturer i sympathize—your work at PEAC is invaluable but anecdotal knowledge from utility people on the firing line is equally important
POWERQUALITY TKEY: Super premium, does that mean a UPS?
POWERQUALITY ANDYV: how do you stop a facility from affecting you super-premium power?
POWERQUALITY TKEY: John, Good Point
POWERQUALITY SAM: Tkey, a ups, local generation or redundant service
POWERQUALITY SKLEIN: This is what I meant earlier by electricity being a non-virtualizable service. You can't make each customer see the power system as though they had their own dedicated generating plant.
POWERQUALITY BRIAN: THE CHAT CHANNEL WILL BE OPEN 24/HRS/DAY 7 DAYS A WEEK
POWERQUALITY TKEY: I must sign out for about 5 minutes but I'll be back
POWERQUALITY BRIAN: OK TOM
POWERQUALITY MSTEARS: PQ for facilities need to be done with a system perspective to to get the right resolution
POWERQUALITY BBOYER: Andy's question is still relevant—how do stop a facility from downgrading utility service to other customers?
POWERQUALITY BRIAN: MIKE>>LETS SWITCH BACK TO RETAIL WHEELING
POWERQUALITY WARD: You work with that customer to do whatever is needed to correct their disturbances.
POWERQUALITY BBOYER: Be more specific
POWERQUALITY MSTEARS: Interaction between facilites can be evaluated and designed for
POWERQUALITY JOHNMUNG: as a key to hardening it helps to identify the most sensitive circuits, i.e. microprocessor logic, test for vulnerability under common surges, sags, rfi, and then notify users that their equipment contains these subsystems—for a start
POWERQUALITY BRIAN: hl DOUG POWERQUALITY GRAVELY: Brian: Are you saving this session as a file? Can we get a list of chat session participants?
POWERQUALITY BRIAN: s, we may
POWERQUALITY DMARKS: gravely: hit TAB and use the arrow keys to page through the list of participants
POWERQUALITY SKLEIN: Will the session be available for downloading?
POWERQUALITY BRIAN: yes, Mike we will publish in PQ Magazine
POWERQUALITY WARD: Part of the agreement for high quality power should be that the customer receiving the power will not disturb the utility system.
POWERQUALITY BRIAN: if john let's us . . .
POWERQUALITY GRAVELY: I tried that, however, netcruiser has a software problem and I cannot see all of the names.

POWERQUALITY SAM: most utilities rules and regulations already require that a customer not put anything back out on the utility system
POWERQUALITY BRIAN: MIKE G.>>WE WILL PUBLISH THIS IN PQ MAG NEXT MONTH IF ASNDY LETS US POWERQUALITY BRIAN: HOW ABOUT IT ANDY?
POWERQUALITY ANDYV: ok
POWERQUALITY BRIAN: COOL
POWERQUALITY WARD: Standards will have to be set for what constitutes a disturbance, and then the utility should work with customers, install filters, etc., to be sure they stay within the rules.
POWERQUALITY BRIAN: THANKS ANDY
POWERQUALITY ANDYV: a meeting review or a sumary of events
POWERQUALITY GRAVELY: It would be good to take a few minutes to recommend how the 15 Nov session could be more effective.
POWERQUALITY BRIAN: A SYNAPSE OF THIS CHAT WILL BE IN NEXT MONTHS PQ MAG
POWERQUALITY WINDSONG:
POWERQUALITY SKLEIN: I don't get PQ mag. Will it be on the Net?
POWERQUALITY BRIAN: STAN SIGN UP FOR IT ON OUR HOME PAGE
POWERQUALITY DOUGC: the transcript of this conference will be available on the EnergyOne pages.
POWERQUALITY BRIAN: YOU CAN SIGN UP ON LINE
POWERQUALITY BRIAN: HTTP://WWW.UTILICORP.COM
POWERQUALITY WINDSONG: Good comment Gravely Comments from the users would be greatly appreciated!!
POWERQUALITY SAM: PQ magazine is available online on the UCU Internet bulletin board, http://www.utilicorp.com
POWERQUALITY ANDYV: or link from powerquality.com
POWERQUALITY BRIAN: YOU CAN GET A FREE MAG SUBSCRIPTION FROM UTILICORP'S HOME PAGE
POWERQUALITY SKLEIN: Thanks
POWERQUALITY BRIAN: ALSO, THERE IS A PQ FORUM ON OUR HOME PAGE
POWERQUALITY JOHNMUNG: for nov 15 shall we pick five key topics? suggest health care, energy storage rfi/emc as a few topics—also new gas turbine 25 kw generator just announce today—just some suggestions
POWERQUALITY BRIAN: GOOD SUGGESTION JOHN
POWERQUALITY ANDYV: lets develop an outline of topics for next time.
POWERQUALITY BRIAN: OK
POWERQUALITY GRAVELY: One suggestion for 15 Nov—Have participants place a list of desired topics on your other chat box and prioritize by interest level.
POWERQUALITY SKLEIN: How about deregulation and retail wheeling.
POWERQUALITY BRIAN: COMMENTS SHOULD BE SENT TO ME BY EMAIL
POWERQUALITY BRIAN: BSPENCER@UTILICORP.COM
POWERQUALITY BRIAN: 15 minutes remaining
POWERQUALITY ANDYZYREK: Let's discuss the new standard IEEE 1159.
POWERQUALITY ANDYV: may be we could generate an online questionaire to see what people are needing discussed.
POWERQUALITY BRIAN: but the chat is available for 24 hrs/day 7 days a week
POWERQUALITY ANDYV: what does IEEE1159 address?
POWERQUALITY BRIAN: Please send all suggestion to me for our next chat
POWERQUALITY BRIAN: Bobbin is not banned now
POWERQUALITY BRIAN: my fault
POWERQUALITY ANDYZYREK: New PQ measuring techniques. We have not received our issue yet.
POWERQUALITY ANDYV: You should have it my now.
POWERQUALITY BRIAN: Bobbin is not banned anymore
POWERQUALITY ANDYV: you can e-mail me or john at: editors@powerquality.com
POWERQUALITY BRIAN: is two hours right fdo rhtis feature
POWERQUALITY JOHNMUNG: do i understand that many programmable logic controllers can be hardened by addition of simple CVT like a sola?
POWERQUALITY ANDYZYREK: Yes, but it is being delivered by snail mail.
POWERQUALITY ANDYV: no 2nd class
POWERQUALITY BRIAN: 15 minutes to go
POWERQUALITY ANDYV: Please e-mail me you complete name and addess and I will mail you one today 1st class . . . now is that serice or what?
POWERQUALITY BRIAN: Is two hours long enough for tthis chat?
POWERQUALITY TKEY: Im back
POWERQUALITY WARD: Brian, I think two hours is about right.
POWERQUALITY BRIAN: hi tom
POWERQUALITY BRIAN: good . . .
POWERQUALITY ANDYV: yes I agree 2 hrs
POWERQUALITY BRIAN: anyone else
POWERQUALITY ANDYV: it the time of day correct?
POWERQUALITY BRIAN: questions now . . .
POWERQUALITY SKLEIN: The topic foremost in my mind right now is what to eat for lunch. I enjoyed the discussion, which I understand has been historic in some sense. But I think I will sign off now and go eat.
POWERQUALITY SAM: 2 hours seems to work very well
POWERQUALITY DANIELH: time of day is good
POWERQUALITY BILLMANN: 2 hrs is fine
POWERQUALITY MSTEARS: Two hours work well, the middle of the day allows east and west coast to be involved
POWERQUALITY BRIAN: good, Will everyone be back for the next chat
POWERQUALITY GRAVELY: Brian, I will forward my recommendations on email, thanks.
POWERQUALITY BILLMANN: yes i'll be back
POWERQUALITY ANDYZYREK: Brian, would it be possible to have a forum published on your home page prior to Nov 15.
POWERQUALITY BRIAN: I would like to do another chat before Nov 15th, any thoughts
POWERQUALITY ANDY: U bet
POWERQUALITY SAM: I believe that this chat may set an attendance record for most participants during a first session
POWERQUALITY JOHNMUNG: a parting thought—"harmonics make the music rich, they make the tone insprinng—harmonics in your power line WILL BLOW THE BUILDINGS WIRING" tIM MUNGENAST
POWERQUALITY BRIAN: Your're all invited to return
POWERQUALITY BRIAN: the next chat
POWERQUALITY BRIAN: This chat feature will help set standards of how we view our industry POWERQUALITY WARD: For me this was two hours very well spent, and it was quite enjoyable.
POWERQUALITY BRIAN: Tell a colleague about our chat Nov 15th
POWERQUALITY BRIAN: Thanks Ward
POWERQUALITY BRIAN: I would like to do this on a weekly basis, any thoughts yet
POWERQUALITY GRAVELY: John: talk it up in Germany!!
POWERQUALITY ANDY: I would like to thank utilicorp and everyone envolved.
POWERQUALITY BRIAN: Thanks Andy for your help
POWERQUALITY WARD: Did this notice go out to the Power Globe mailing list?
POWERQUALITY BRIAN: No, but could help us Ward with that
POWERQUALITY BRIAN: Lets all get the word out about this chat
POWERQUALITY WARD: I'm on the list and will be glad to forward anything you wish to it.
POWERQUALITY BRIAN: Please use it whenver you wish, even schedule your own chats whenver
POWERQUALITY JOHNMUNG: MANY THANKS TO UTILICORP AND ALL INVOLVED-FROM AN OLD STEAM BOATER :-)
POWERQUALITY BRIAN: thanks ward
POWERQUALITY BRIAN: Hi duane
POWERQUALITY BRIAN: This chat is officially over, but do stick around for more chatting
POWERQUALITY BRIAN: Thanks to all, cya on Nov 15th
POWERQUALITY MSTEARS: Ward, Tom, and John I appreciate your participation
POWERQUALITY BRIAN: Thanks Guys and Ladies!!!!!!!!!!!
POWERQUALITY SWPPD: WHAT IS HAPPENING ON NOV. 15
POWERQUALITY BRIAN: our next chat with a panel of experts
POWERQUALITY BRIAN: topic yet to be decided
POWERQUALITY DPSWOBO: Hi Brian, Sorry I was on the phone and could not respond right away. Did I get the time incorrectly for the chat?
POWERQUALITY BRIAN: please send us a suggestions
POWERQUALITY ANDY: good bye ;-)
POWERQUALITY BRIAN: Yeah, but stick around to chat with some friends
POWERQUALITY BRIAN: We had a total of 50 people and avg of 20 people at one time
POWERQUALITY BRIAN: Thanks everyone!!!Lunch Time
POWERQUALITY BRIAN: Next Chat Nov 15th at 10-12 ct
POWERQUALITY BRIAN: But this chat line is available 24 hrs/day/7 days a week
POWERQUALITY BRIAN: Please use it whenever
POWERQUALITY GRAVELY: Thanks to the panel and Utilicorp for the session!
POWERQUALITY BRIAN: Talk to your collegues and friends about any particular topic
POWERQUALITY BRIAN: Come see our home page for new topics and chats
POWERQUALITY BRIAN: http://www.utilicorp.com
POWERQUALITY BRIAN: Thanks Power Quality Assurance Magazine and All our panel members
POWERQUALITY BRIAN: :)
POWERQUALITY SWPPD: MISSED THIS SESSION. ICAN WE GET HARD COPY INFO?
POWERQUALITY BRIAN: yes swwp, it will be published in pq mag and our home page
POWERQUALITY BRIAN: catch our next session on nov 15th
POWERQUALITY BRIAN: 10-12 ct
POWERQUALITY SWPPD: THANKS A BUNCH!!
POWERQUALITY SWPPD: GOOD BYE!
POWERQUALITY BRIAN: no prob
POWERQUALITY BRIAN: cya
POWERQUALITY DESWETT:
POWERQUALITY TKEY: Good session brian, ddorr and I will be signing off now, look forward to the next session
POWERQUALITY DPSWOBO: Thanks for the info on the next session, we will get on next time
POWERQUALITY DMARKS: I hope everyone enjoyed this session.
POWERQUALITY MSTEARS: I am logging off Thanks
POWERQUALITY SAM: This is Tony and I am watching the action . . . we made history. Great work guys.
POWERQUALITY BRIAN: Lunch time
POWERQUALITY BRIAN: Next chat is nov 15th
POWERQUALITY BRIAN: 10-12 ct
POWERQUALITY BRIAN: please continuie to look at utilicorp's hp
POWERQUALITY BRIAN: for more info
POWERQUALITY BRIAN: email if you have any questions regarding the chat
POWERQUALITY BRIAN: bspencer@utilicorp.com
POWERQUALITY BRIAN: later
SUPPORT BRIAN: hi guys
SUPPORT BRIAN: success
SUPPORT BRIAN: yess!!!!!!!!!!!!!!!!!!!!!!!!!!!!!!!!!!!!!!!!!!!!!!!!!!!!!!!!!!!!!!!!
SUPPORT BRIAN: thanks for the help
SUPPORT BRIAN: cya
POWERQUALITY BRIAN: next chat on Nov 15th
POWERQUALITY BRIAN: 10-12 ct
POWERQUALITY BRIAN: any suggestion on topics please contact me by email
POWERQUALITY BRIAN: bspencer@utilicorp.com
POWERQUALITY BRIAN: hi chuck
POWERQUALITY BRIAN: hi randy
POWERQUALITY CPREECS: hello brian
POWERQUALITY BRIAN: How are you chuck
POWERQUALITY CPREECS: how has the participation been?
POWERQUALITY BRIAN: I am sorry you missed the offical chat, but do come back at any time for some chatting
POWERQUALITY BRIAN: great 20 people avg. 50 total people
POWERQUALITY CPREECS: ?yes, i got some conflicting info
POWERQUALITY BRIAN: transcripts will be in PQ mag next month and on utilicorp's home page
POWERQUALITY CPREECS: what were the topics discussed?
POWERQUALITY BRIAN: how is that chuck
POWERQUALITY BRIAN: power quality, standards,
POWERQUALITY BRIAN: retail wheeling
POWERQUALITY BRIAN: cya, lunch time
POWERQUALITY CPREECS: later
POWERQUALITY BRIAN: bye all
POWERQUALITY BRIAN: email me chuck
POWERQUALITY RB: sorry I missed it. I got 12-2 est off the net. bye.
POWERQUALITY BRIAN: sorry RB
POWERQUALITY BRIAN: miss information POWERQUALITY BRIAN: next chat is 10-12
POWERQUALITY BRIAN: ct
POWERQUALITY BRIAN: nov 15th
POWERQUALITY BRIAN: bye
POWERQUALITY RB: thanks
POWERQUALITY BRIAN: no prob, tell all
POWERQUALITY ANDY: Is anyone still here talking about power quality?
POWERQUALITY DAVE: Just signed on that is what I was trying to find out
POWERQUALITY ANDY: the PQ chat was running from 11:00-1:00 est
POWERQUALITY ANDY: Were you involved then?
POWERQUALITY DAVE: No I just got a chance to sign on now
POWERQUALITY ANDY: there were some great discussions.
POWERQUALITY ANDY: The transcripts will be available to down load at utilicorp.com Brian Spencer says.
POWERQUALITY ANDY: What is your experience in PQ
POWERQUALITY DAVE: That is what I was looking for, are they available to down load now, I work in a data center and have worked with UPS systems for about 12 years
POWERQUALITY DAVE: I did field service for Exide
POWERQUALITY ANDY: Brian just went to Lunch in KS I don/t know when it will availalbe.
POWERQUALITY DAVE: Thanks for the Info on the downloads, I hope they do this again
POWERQUALITY ANDY: so do I.
POWERQUALITY DAVE: What is your experience on PQ
POWERQUALITY ANDY: I am the editor or Power quality mag.
POWERQUALITY DAVE: Good mag., I pick up alot in it
POWERQUALITY ANDY: do your receive power quality assurance magazine?
POWERQUALITY ANDY: great glad to hear it.
POWERQUALITY DAVE: We get it at work but I have asked to have it sent to my home
POWERQUALITY ANDY: did you get the latest issue witht the lighting on the cover?
POWERQUALITY DAVE: Not yet, have seen it on line though
POWERQUALITY ANDY: great.
POWERQUALITY ANDY: any suggestion for editorial?
POWERQUALITY DAVE:
POWERQUALITY DAVE: no it is good
POWERQUALITY ANDY: ok.
POWERQUALITY ANDY: I am currently editing an article about VRLA battery charging.
POWERQUALITY DAVE: I am working on a resonant problem with Utility and was looking for info
POWERQUALITY ANDY: explain
POWERQUALITY ANDY: by the way my e-mail is andy@powerquality.com
POWERQUALITY DAVE: we are running a lot of 5th har. across our system in a large data center
POWERQUALITY ANDY: I see
POWERQUALITY ANDY: I will try to address this in an upcomming issue. may be march/april or even sooner.
POWERQUALITY DAVE: we have 4800 kw of UPS cap on two transformers and we have alot of 5th on our other boards
POWERQUALITY ANDY: If you are interested in writing up a case history including you solutions I would like to review it and poss. publish
POWERQUALITY MSTONEHAM: Is this chat session still active?
POWERQUALITY ANDY: YES
POWERQUALITY ANDY: We can'nt get enough! ! !
POWERQUALITY DAVE: when we can get it fixed, It looks like we have a problem with input filtering on a couple of UPS,s
POWERQUALITY ANDY: input fro the utility or a generator?
POWERQUALITY DAVE: utility
POWERQUALITY MSTONEHAM: I understand there was a chat session earlier today with some guest "chatters". Is there an archive of the discussion since I missed it?
POWERQUALITY DAVE: we have 66 kv to 12 kv then to 480 v by 4 trans on property
POWERQUALITY ANDY: What are you leaning towards in a solution dave
POWERQUALITY ANDY: MTONEHAM>>yes but I don't know when. contact BSPENCER@utilicorp.com
POWERQUALITY DAVE: the computer seem to have no problem, but we have alot of motor heating/bad PF
POWERQUALITY MSTONEHAM: Thanks!
POWERQUALITY DAVE: we currently are working with a consultant but I am looking for more info
POWERQUALITY ANDY: will capacitors solve your problem
POWERQUALITY ANDY:
POWERQUALITY ANDY: there also is a forum under utilicorp.com where you can post you questions.
POWERQUALITY DAVE: Each 600 kw UPS has Input filtering/may need trap for 5th
POWERQUALITY ANDY: or you can access it form powerquality.com
POWERQUALITY DAVE: thanks
POWERQUALITY ANDY: Talk to ya later dave
POWERQUALITY DAVE: is PQ.com your Mag
POWERQUALITY ANDY: bye
POWERQUALITY DAVE: bye
POWERQUALITY ANDY: yes
POWERQUALITY DAVE: thanks
POWERQUALITY ANDY: :-)
POWERQUALITY MSTONEHAM:
POWERQUALITY MSTONEHAM: Is anyone else hear? There doesn't seem to be much traffic.
POWERQUALITY MSTONEHAM:
POWERQUALITY CILCOJRG: Hello—is the conference over?
POWERQUALITY CILCOJRG:
POWERQUALITY CILCOJRG: hello
POWERQUALITY BRIAN: yes
POWERQUALITY BRIAN: the conference was from 10-12 ct
POWERQUALITY BRIAN: someone gave out the wrong information
POWERQUALITY BRIAN: hello cilco
POWERQUALITY BRIAN: anyone still there
SUPPORT BRIAN: hi all
SUPPORT BRIAN: anyone there
POWERQUALITY BRIAN: jenny>>are you there
POWERQUALITY CJBOUTCHER: is anyone here a utility employee?
POWERQUALITY BRIAN: Hi chris
POWERQUALITY BRIAN: how are you?
POWERQUALITY CJBOUTCHER: hi brian it is quiet in here
POWERQUALITY BRIAN: the conference was at 10:00 ct
POWERQUALITY CJBOUTCHER: ah I see
POWERQUALITY CJBOUTCHER: when is the next one?
POWERQUALITY BRIAN: nov 15th
POWERQUALITY BRIAN: 10-12

POWERQUALITY BRIAN: ct
POWERQUALITY CJBOUTCHER: is the channel open at other times?
POWERQUALITY BRIAN: yes 24 hours a day
POWERQUALITY CJBOUTCHER: but not much discussion?
POWERQUALITY BRIAN: not right now,
POWERQUALITY BRIAN: cya
POWERQUALITY CJBOUTCHER: bye
POWERQUALITY BRIAN: hi jenny
POWERQUALITY JOSH: hello?
POWERQUALITY BRIAN: hi dan
POWERQUALITY BRIAN: hi dan
POWERQUALITY BRIAN: are you awake yet?
POWERQUALITY BRIAN: just giving present this a.m.
POWERQUALITY BRIAN: :)
POWERQUALITY BRIAN: who is guest96
POWERQUALITY GUEST96: test While a particular embodiment of the present invention has been disclosed, it is to be understood that various different modifications are possible and are within the true spirit of the invention, the scope of which is to be determined with reference to the claims set forth below. There is no intention, therefore, to limit the invention to the exact disclosure presented herein as a teaching of one embodiment of the invention.

I claim:

1. An apparatus comprising:
a computer system, the computer system including a controller computer and a database which serves as a repository of tokens for other programs to access, thereby affording information to each of a plurality of participator computers via the Internet network,
the controller computer communicating with the participator computers, according to permissions retrieved from the repository of tokens of the database, the controller computer running controller software, in accordance with predefined rules, directing arbitration of which ones of the participator computers connect within a group of the participator computers interactively connected after recognizing a user identity, providing on the controller computer an API, the API multiplexing and demultiplexing API messages by type, creating a virtual connection and providing the virtual connection between channels, private messages, and multimedia objects in the controller computer and the participator computers, and providing communication of at least some real-time communications within the group of the interactively connected said participator computers.

2. The apparatus of claim 1, wherein some of the communications which are received at a first of the participator computers in the group, from a second of the participator computers, include pre-stored data representing at least one of video, a graphic, sound, and multimedia, and the first of the participator computers determines internally whether or not the first of the participator computers can present the data, if it is determined that the first of the participator computers can not present the data, then obtaining an agent with an ability present the data, and otherwise presenting the data.

3. The apparatus of claim 1, wherein for the communications which are received at a first of the participator computers in the group and which present an Internet URL, the computer system facilitates handling the Internet URL via the computer system so as to find content specified by the Internet URL and presenting the content at an output device of the first participator computer.

4. The apparatus of claim 2, wherein for the communications which are received at the first of the participator computers in the group and which present an Internet URL, the computer system facilitates handling the Internet URL via the computer system so as to find content specified by the Internet URL and presenting the content at an output device of the first participator computer.

5. The apparatus of claim 1, wherein censorship is determined by determining whether a respective parameter corresponding to the user identity has been determined by an other user.

6. The apparatus of claim 2, wherein censorship is determined by determining whether a respective parameter corresponding to the user identity has been determined by an other user.

7. The apparatus of claim 3, wherein censorship is determined by determining whether a respective parameter corresponding to the user identity has been determined by an other user.

8. The apparatus of claim 4, wherein censorship is determined by determining whether a respective parameter corresponding to the user identity has been determined by an other user.

9. The apparatus of claim 1, wherein the controller computer system is programmed to provide access to the controller computer system via any of two client software alternatives, wherein both of the two client software alternatives allow respective user identities to be recognized by the controller computer system and wherein at least one of client software alternatives allows the controller computer system to determine whether the user identity is censored with respect to at least one of a pointer, video, audio, graphic, and multimedia such that if the user identity is determined to be censored from sending said at least one, not allow the user identity to send said at least one, and if the user identity is determined to be censored from presenting said at least one, not allow the user identity to present said at least one.

10. The apparatus of claim 2, wherein the controller computer system is programmed to provide access to the controller computer system via any of two client software alternatives, wherein both of the two client software alternatives allow respective user identities to be recognized by the controller computer system and wherein at least one of client software alternatives allows the controller computer system to determine whether the user identity is censored with respect to at least one of a pointer, video, audio, graphic, and multimedia such that if the user identity is determined to be censored from sending said at least one, not allow the user identity to send said at least one, and if the user identity is determined to be censored from presenting said at least one, not allow the user identity to present said at least one.

11. The apparatus of claim 3, wherein the controller computer system is programmed to provide access to the controller computer system via any of two client software alternatives, wherein both of the two client software alternatives allow respective user identities to be recognized by the controller computer system and wherein at least one of client software alternatives allows the controller computer system to determine whether the user identity is censored with respect to at least one of a pointer, video, audio, graphic, and multimedia such that if the user identity is determined to be censored from sending said at least one, not allow the user identity to send said at least one, and if the user identity is determined to be censored from presenting said at least one, not allow the user identity to present said at least one.

12. The apparatus of claim 4, wherein the controller computer system is programmed to provide access to the controller computer system via any of two client software alternatives, wherein both of the two client software alternatives allow respective user identities to be recognized by the controller computer system and wherein at least one of client software alternatives allows the controller computer system to determine whether the user identity is censored with respect to at least one of a pointer, video, audio, graphic, and multimedia such that if the user identity is determined to be censored from sending said at least one, not allow the user identity to send said at least one, and if the user identity is determined to be censored from presenting said at least one, not allow the user identity to present said at least one.

13. The apparatus of claim 5, wherein the controller computer system is programmed to provide access to the controller computer system via any of two client software alternatives, wherein both of the two client software alternatives allow respective user identities to be recognized by the controller computer system and wherein at least one of client software alternatives allows the controller computer system to determine whether the user identity is censored with respect to at least one of a pointer, video, audio, graphic, and multimedia such that if the user identity is determined to be censored from sending said at least one, not allow the user identity to send said at least one, and if the user identity is determined to be censored from presenting said at least one, not allow the user identity to present said at least one.

14. The apparatus of claim 6, wherein the controller computer system is programmed to provide access to the controller computer system via any of two client software alternatives, wherein both of the two client software alternatives allow respective user identities to be recognized by the controller computer system and wherein at least one of client software alternatives allows the controller computer system to determine whether the user identity is censored with respect to at least one of a pointer, video, audio, graphic, and multimedia such that if the user identity is determined to be censored from sending said at least one, not allow the user identity to send said at least one, and if the user identity is determined to be censored from presenting said at least one, not allow the user identity to present said at least one.

15. The apparatus of claim 7, wherein the controller computer system is programmed to provide access to the controller computer system via any of two client software alternatives, wherein both of the two client software alternatives allow respective user identities to be recognized by the controller computer system and wherein at least one of client software alternatives allows the controller computer system to determine whether the user identity is censored with respect to at least one of a pointer, video, audio, graphic, and multimedia such that if the user identity is determined to be censored from sending said at least one, not allow the user identity to send said at least one, and if the user identity is determined to be censored from presenting said at least one, not allow the user identity to present said at least one.

16. The apparatus of claim 8, wherein the controller computer system is programmed to provide access to the controller computer system via any of two client software alternatives, wherein both of the two client software alternatives allow respective user identities to be recognized by the controller computer system and wherein at least one of client software alternatives allows the controller computer system to determine whether the user identity is censored with respect to at least one of a pointer, video, audio, graphic, and multimedia such that if the user identity is determined to be censored from sending said at least one, not allow the user identity to send said at least one, and if the user identity is determined to be censored from presenting said at least one, not allow the user identity to present said at least one.

17. A method of communicating content among users using of a computer system including a controller computer and a database which serves as a repository of tokens for other programs to access, thereby affording information to each of a plurality of participator computers which are otherwise independent of each other, the method comprising:
 affording some of the information to a first of the participator computers via the Internet network;
 affording some of the information to a second of the participator computers via the Internet network;
 running controller software on the controller computer, in accordance with predefined rules, to direct arbitration of which ones of the participator computers connect within a group of the participator computers interactively connected after recognizing a user identity, providing an API on the controller computer, the API multiplexing and demultiplexing API messages by type, creating a virtual connection and providing the virtual connection between channels, private messages, and multimedia objects in the controller computer and the participator computers; and
 communicating at least some real-time messages within the group of the interactively connected said participator computers.

18. The method of claim 17, wherein the controller computer system is programmed to provide access to the controller computer system via any of two client software alternatives, wherein both of the two client software alternatives allow respective user identities to be recognized by the controller computer system and wherein at least one of client software alternatives allows the controller computer system to determine whether the user identity is censored with respect to at least one of a pointer, video, audio, graphic, and multimedia such that if the user identity is determined to be censored from sending said at least one, not allow the user identity to send said at least one, and if the user identity is determined to be censored from presenting said at least one, not allow the user identity to present said at least one.

19. The method of claim 17, wherein for the communications which are received at a first of the participator computers in the group, from a second of the participator computers, that include pre-stored data representing at least one of video, a graphic, sound, and multimedia, the first of the participator computers determines internally whether or not the first of the participator computers can present the pre-stored data, if it is determined that the first of the participator computers can not present the pre-stored data then obtaining an agent with an ability to present the pre-stored data, and otherwise presenting the pre-stored data, and wherein for the communications which are received at a first of the participator computers in the group and which present an Internet URL, facilitating handling the Internet URL via the computer system so as to find content specified by the Internet URL and presenting the content at an output device of the first participator computer.

* * * * *